(12) United States Patent
Kaberg Johard

(10) Patent No.: US 12,372,929 B2
(45) Date of Patent: Jul. 29, 2025

(54) MACHINE LEARNING FOR TECHNICAL SYSTEMS

(71) Applicant: Leonard Kaberg Johard, Tatarstan (RU)

(72) Inventor: Leonard Kaberg Johard, Tatarstan (RU)

( * ) Notice: Subject to any disclaimer, the term of this patent is extended or adjusted under 35 U.S.C. 154(b) by 838 days.

(21) Appl. No.: 17/634,974

(22) PCT Filed: Jul. 8, 2020

(86) PCT No.: PCT/SE2020/050717
§ 371 (c)(1),
(2) Date: Feb. 12, 2022

(87) PCT Pub. No.: WO2021/029802
PCT Pub. Date: Feb. 18, 2021

(65) Prior Publication Data
US 2022/0326664 A1 Oct. 13, 2022

(30) Foreign Application Priority Data
Aug. 13, 2019 (SE) .................................... 1950924-9

(51) Int. Cl.
G05B 13/02 (2006.01)
G06N 3/04 (2023.01)
G06N 20/10 (2019.01)

(52) U.S. Cl.
CPC .............. G05B 13/0265 (2013.01)

(58) Field of Classification Search
CPC .... G05B 13/0265; G06N 20/10; G06N 3/126; G06N 3/006; G06N 3/0442; G06N 3/084; G06N 3/045
(Continued)

(56) References Cited

U.S. PATENT DOCUMENTS

| 2013/0325774 A1 | 12/2013 | Sinyavskiy et al. |
| 2017/0140270 A1 | 5/2017 | Mnih et al. |
| 2020/0175364 A1* | 6/2020 | Xu ......................... G06N 3/045 |

FOREIGN PATENT DOCUMENTS

| JP | 2007065929 A | 3/2007 |
| JP | 2008305064 A | 12/2008 |

(Continued)

OTHER PUBLICATIONS

Jalaj Bhandari; Daniel Russo; Raghav Singal: "A finite time analysis of temporal difference learning with linear function approximation", arxiv.org, 2018.

(Continued)

Primary Examiner — Michael J Brown
(74) Attorney, Agent, or Firm — Amit Kulkarni

(57) ABSTRACT

A system for supporting machine learning having one or more processors; a memory configured to store one or more parameters of an estimator; a differentiable estimator of discounted reward, referred to as a value estimator, configured to receive an observation including information representative of one or more observations of an environment and/or system, access parameters of the value estimator from memory and generate a discounted reward estimate, referred to as a value estimate. The system includes one or more eligibility trace generators configured to receive the value estimate; receive from the value estimator a partial derivative of the value estimate with respect to one of the parameters of a value estimation process; receive a signal from the eligibility trace generator and generate an updated signal, referred to as an eligibility trace. The system having one or more bootstrapped gradient estimators configured to receive a reward signal from a technical reward system; receive the value estimate and the eligibility trace; and create a gradient estimate based on an input including: the reward; the eligi- (Continued)

bility trace; the value estimate; and the gradient of the value estimate.

20 Claims, 8 Drawing Sheets

(58) Field of Classification Search
USPC .......................................................... 700/47
See application file for complete search history.

(56) References Cited

FOREIGN PATENT DOCUMENTS

| WO | 18083532 A1 | 5/2018 |
| WO | 18153807 A1 | 8/2018 |
| WO | 18156891 A1 | 8/2018 |
| WO | 18211139 A1 | 11/2018 |
| WO | 18224695 A1 | 12/2018 |

OTHER PUBLICATIONS

International Search Report for PCT/SE2020/050717, prepared by the SE Patent Office, mailing date Oct. 19, 2020, 6 pages.

Leonard Johard A connectionist actor-critic algorithm for faster learning plausibility and 2014 IEEE International Conference on Robotics & Automation (ICRA), China, IEEE, Jun. 7, 2014, p. 3903-3909.

Japanese Office Action, Japanese Patent Application No. 2022-507704, Date of Drafting: Reiwa 6 Jun. 21, 2024, 7 pages including the English translation.

* cited by examiner

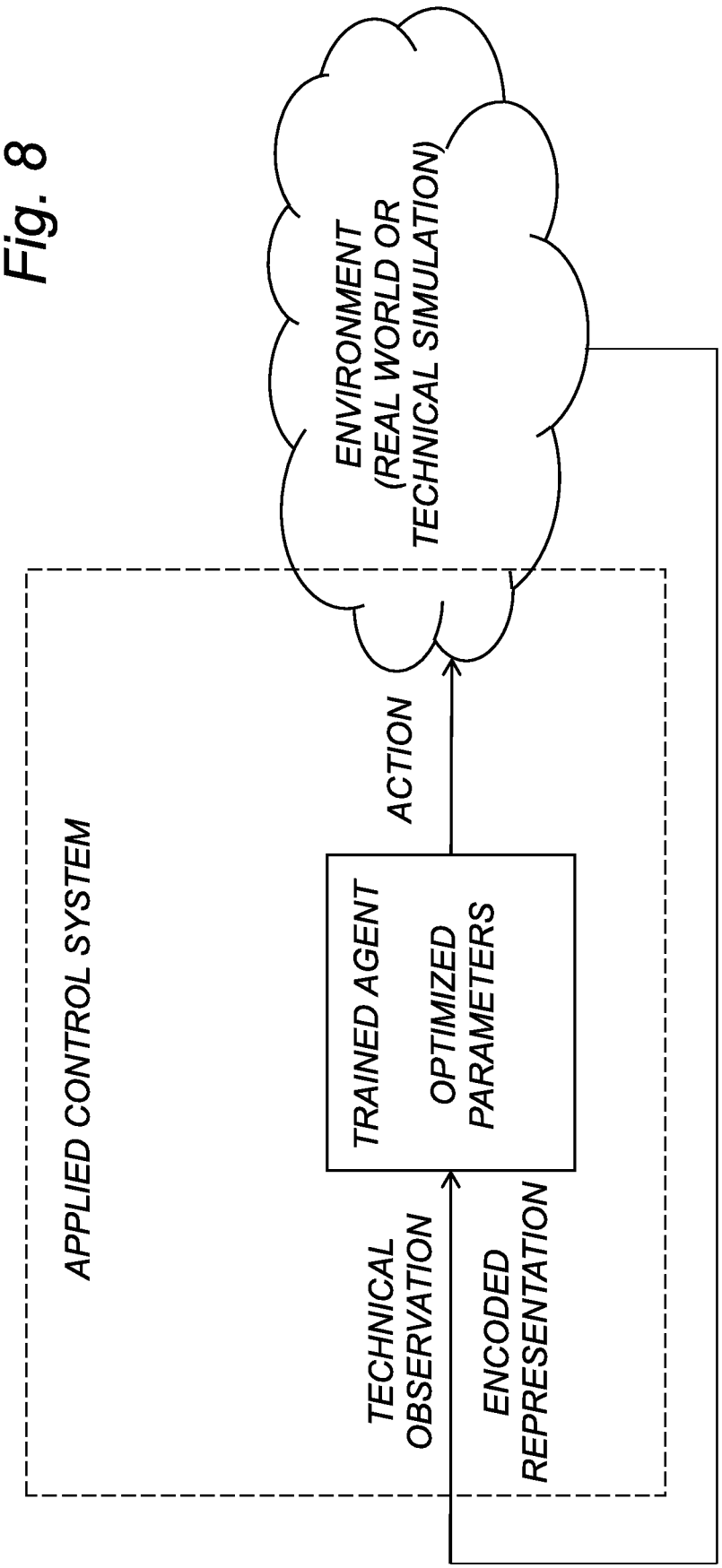

MACHINE LEARNING FOR TECHNICAL SYSTEMS

CROSS-REFERENCE TO RELATED APPLICATION

This application is the U.S. national phase of PCT Application No. PCT/SE2020/050717 filed on Jul. 8, 2020, which claims priority to SE Patent Application No. 1950924-9 filed on Aug. 13, 2019, the disclosures of which are incorporated in their entirety by reference herein.

TECHNICAL FIELD

The invention generally relates to machine learning systems for control of technical systems, in particular methods and systems for value estimation for reinforcement learning, and related data processors and processor control code, e.g. implemented as a computer program and computer-program product. The proposed technology specifically relates to a method and system for supporting machine learning, an apparatus for reinforcement learning, a self-learning control system for a controllable technical system, as well as a corresponding computer program and computer-program product.

BACKGROUND

Machine learning through reinforcement learning involves training a technical machine to generate actions from received observations from a technical system (such as measurements from one or more sensors in a real-world environment) and/or a technical simulation according to some automatic control system called a policy. The policy is a stochastic control system whose behavior depends on some parameters.

Such a learning machine is known as an agent and it is commonly described as interacting with some environment that is in some certain state. The environment is assumed to change state over time according to some distribution that depends on its current state and the action taken by the agent and optionally also unknown factors and/or influences to the environment. The environment generates an observation and a reward, which can be regarded as a technical feedback, based on this state.

Environment in this context is an abstraction that can include a very wide range of subject systems such as sensors, a system for calculating reward, other learning machines, simulators as well as the whole physical universe or part thereof.

The goal of the training process in general is to generate a policy that optimizes the reward given over time. Usually the specific task is to maximize the average discounted reward.

Reinforcement learning has a larger range of applications than supervised learning, but is also more challenging due to the limited feedback available. Unlike supervised learning, a reinforcement learning agent has no specific outputs to imitate. Instead, it has to explore the results of various possible actions empirically.

A common strategy to facilitate the reinforcement learning process is to use a value estimator, which is a system that tries to estimate the future discounted reward. In many reinforcement learning methods, the learning process takes place solely through control and/or manipulation of the value estimator.

A change of state typically results in rewards with significant time delays. A central problem in value estimation systems is the need to accurately track what observations lead to later rewards in a computationally efficient way.

In particular, approaches using so-called backpropagation through time suffer from problems with memory and computational scaling with time delays. Table-based systems are inflexible, poor at generalizing and scale poorly with input size. Approaches using Temporal Difference (TD) learning only locally at each time step (e.g. TD(0)) have problems with scaling with changing time steps sizes and generally need several passes or iterations to propagate rewards in time if the time step is small. Monte Carlo-evaluations have a poor ability to use the data efficiently due to the lack of bootstrapping. Extensions such as TD-lambda based methods are known to not converge, while gradient TD methods are primarily working on linear problems and/or with discrete actions.

In general, bootstrapping in the reinforcement learning context is defined as methods that use an estimated value to estimate a similar kind of value. In particular, it includes maintaining a statistical estimate of the future discounted reward that is derived in part, or in full, from an existing estimate of the future discounted reward. The temporal difference algorithm is a typical example of this.

An overview of methods in reinforcement learning can be found in the books: "Reinforcement learning and dynamic programming using function approximators" [Busoniu, L., Babuska, R., De Schutter, B. and Ernst, D., 2017] and "Reinforcement learning: An introduction." [Sutton, Richard S., and Andrew G. Barto., 2011]. Further details on related approaches can be found in "True online temporal-difference learning." [Van Seijen, Harm, et al., The Journal of Machine Learning Research, 2016].

There is a general need for improvements for technical reinforcement learning systems and/or applications.

SUMMARY

It is a general object to provide an efficient system and method for supporting and/or assisting technical machine learning systems and/or related applications.

It is a specific object to provide an efficient system and method for assisting and/or supporting technical machine learning systems, given a specific reward system and target technical system and/or environment for training, in estimating the gradient of estimators of the discounted future reward.

It is another object to provide an efficient estimation of parameters for an estimator of the discounted future reward system for a given reward system and a given a target technical system and/or environment.

It is another object to efficiently generate technical value estimators for a given reward system and a given target technical system and/or environment.

It is still another object to provide an efficient generation of control systems and/or programs for controlling a given target technical system and/or technical system which the target technical system approximates, wherein the efficiency of the control is measured or approximated according to the technical objectives encoded in a given reward system.

It is yet another object to provide efficient generation of intelligent industrial planning systems, robots and vehicles through reinforcement learning.

A specific object is to provide a method and system for supporting machine learning.

Another specific object is to provide an apparatus for reinforcement machine learning.

Yet another specific object is to provide a self-learning control system for a controllable technical system.

It is also a specific object to provide a corresponding computer program and computer-program product.

It is another object to provide a method for at least partly assembling and/or configuring a fully or partially automated robot and/or vehicle.

It is yet another object to provide a method for performing an at least partially automated industrial process.

These and other objects are met by embodiments as defined herein.

According to a first aspect, there is provided a system for supporting machine learning. The system comprises:
one or more processors;
a memory configured to store one or more parameters of an estimator;
a differentiable estimator of discounted reward, the differentiable estimator also being referred to as a value estimator, configured to, by the one or more processors: receive an observation including information representative of one or more observations of an environment and/or system at a moment in time, access parameters of the value estimator from the memory and generate a discounted reward estimate, also referred to as a value estimate, in a value estimation process;
one or more eligibility trace generators configured to, continuously and/or through several steps and/or moments of the eligibility trace generator and by the one or more processors: receive the value estimate; receive from the value estimator a partial derivative of the value estimate with respect to one of the parameters of the value estimation process; receive a signal from the eligibility trace generator and generate an updated signal, also referred to as an eligibility trace, such that each step and/or moment comprises operations such that:
the signal is decaying in real or simulated time at a rate proportional to the respective signal, i.e. exponential decay in time corresponding to the observation;
to the signal is added a value proportional to the partial derivative of the value estimate;
thereby maintaining or keeping a signal, between steps and/or moments of the eligibility trace generator, by values being added and/or subtracted at various moments to the eligibility trace while the resulting sum undergoes an exponential decay in time; and
one or more bootstrapped gradient estimators configured to, by the one or more processors: receive a reward signal from a technical reward system; receive the value estimate; receive the eligibility trace; and create a gradient estimate based on an input comprising: the reward; the eligibility trace; the value estimate; and the gradient of the value estimate.

According to a second aspect, there is provided a computer-implemented and/or apparatus-implemented method for supporting machine learning. The method comprises the steps of:
obtaining: a value based on an eligibility trace and/or another estimate of a discounted sum of past gradient(s) of a value estimator, for each of one or more of the value estimator parameters; and a reward as part of technical feedback from a technical system and/or environment; and optionally any additional value estimate;
generating a value estimator gradient estimate, for use in an apparatus or computer-implemented program for performing gradient-based parameter optimization of some value estimator, referred to as an optimizer, based on each of the following signals:
a value proportional to: the value estimate multiplied by the gradient of the value estimate with respect to the weights such that this value is also separable from any contribution to the gradient estimate that is proportional to the value estimate multiplied by the discounted sum of past gradient(s);
a value proportional to: the reward multiplied by the eligibility trace and/or a value proportional to the other estimate of the discounted sum of past gradient(s);
a value proportional to: the eligibility trace and/or a value proportional to the other estimate of discounted sum of past gradient(s) multiplied by variable V2, V2 being any value estimate, for the same or a following moment or time step; and
directing said gradient estimate to said optimizer.

According to a third aspect, there is provided an apparatus for reinforcement machine learning configured to perform such a method.

According to a fourth aspect, there is provided a computer program comprising instructions, which when executed by at least one processor, cause the at least one processor to perform such a method.

According to a fifth aspect, there is provided a computer-program product comprising a non-transitory computer-readable medium having stored thereon such a computer program.

According to a sixth aspect, there is provided a self-learning control system for a controllable technical system, wherein the self-learning control system comprises a system for supporting machine learning or an apparatus for reinforcement machine learning as defined herein.

According to a seventh aspect, there is provided a method for at least partly assembling and/or configuring a fully or partially automated robot and/or vehicle, wherein the method comprises:
configuring one or more processors of the robot and/or vehicle according to determined/optimized actor parameter(s); or
including in the robot and/or vehicle one or more processor(s) designed and/or configured according to determined/optimized actor parameter(s).

In this way, it is possible to provide efficient assembly and/or configuration of a fully or partially automated robot and/or vehicle.

According to an eighth aspect, there is provided a method for performing an at least partially automated industrial process, wherein the industrial process is conducted based on control signal(s) from a carefully configured/designed technical planning system.

In this way it is possible to, e.g. efficiently generate products of an automated industrial process.

In a sense, the proposed technology can be regarded as a system that uses statistical bootstrapping and allows the use of a subsystem known as eligibility traces to optimize a value estimation for reinforcement machine learning. The eligibility traces use exponentially decaying signals to store the information needed to create a gradient estimate signal. Embodiments of this aspect are typically used in actor-critic systems to create self-learning control systems for robots, vehicles and planning systems.

By way of example, there is provided a method and corresponding system that by bootstrapping and the possibility of using eligibility traces are able to optimize the parameters of a neural network for the purpose of performing value estimation for reinforcement machine learning.

At least one of the following technical effects can be contributed by the present invention: reduced memory usage by not having to store past states; reduced memory by improved scaling with number of parameters; reduced computation time; non-linear approximation; simplified hardware architectures; gradual transition between learning assumptions; faster expected value estimation convergence on a large set of reinforcement learning problems through bootstrapping; better convergence conditions; and providing an alternative to prior systems and methods.

Other advantages offered by the invention will be appreciated when reading the below description of embodiments of the invention.

BRIEF DESCRIPTION OF THE DRAWINGS

The invention, together with further objects and advantages thereof, may best be understood by making reference to the following description taken together with the accompanying drawings, in which:

FIG. 8 is a schematic diagram illustrating an example of the underlying technical setting of a trained agent adapted for interacting with a technical environment.

DETAILED DESCRIPTION

Throughout the drawings, the same reference numbers are used for similar or corresponding elements.

Figure 1:
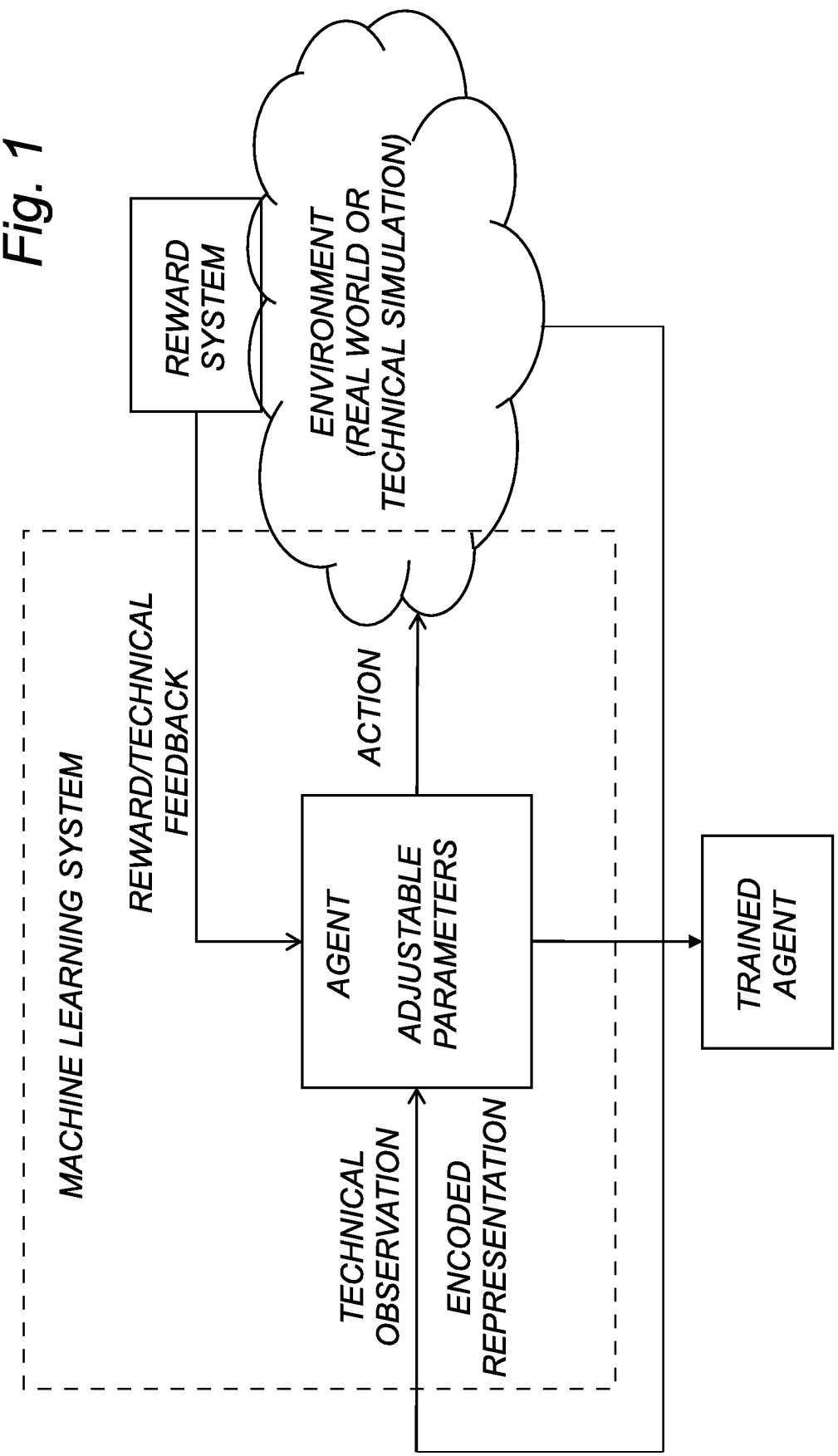
FIG. 1 is a schematic diagram illustrating an example of the underlying technical setting of a machine learning system adapted for generating actor parameters through interaction with a technical target system and/or environment.
Figure 2:
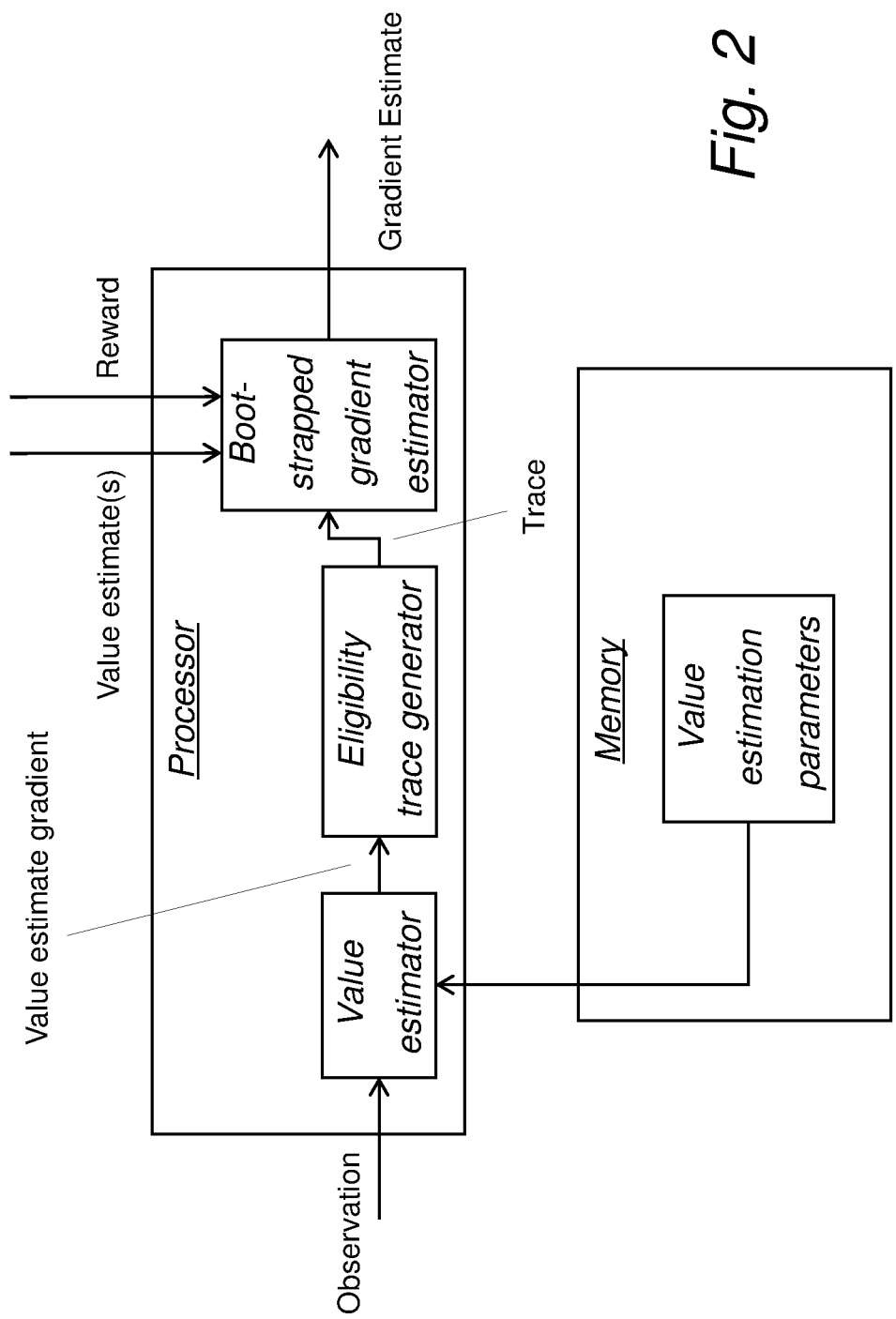
FIG. 2 is a schematic diagram illustrating an example of a processor-memory based system for reinforcement machine learning and/or value estimation therefor according to an embodiment.
Figure 3:
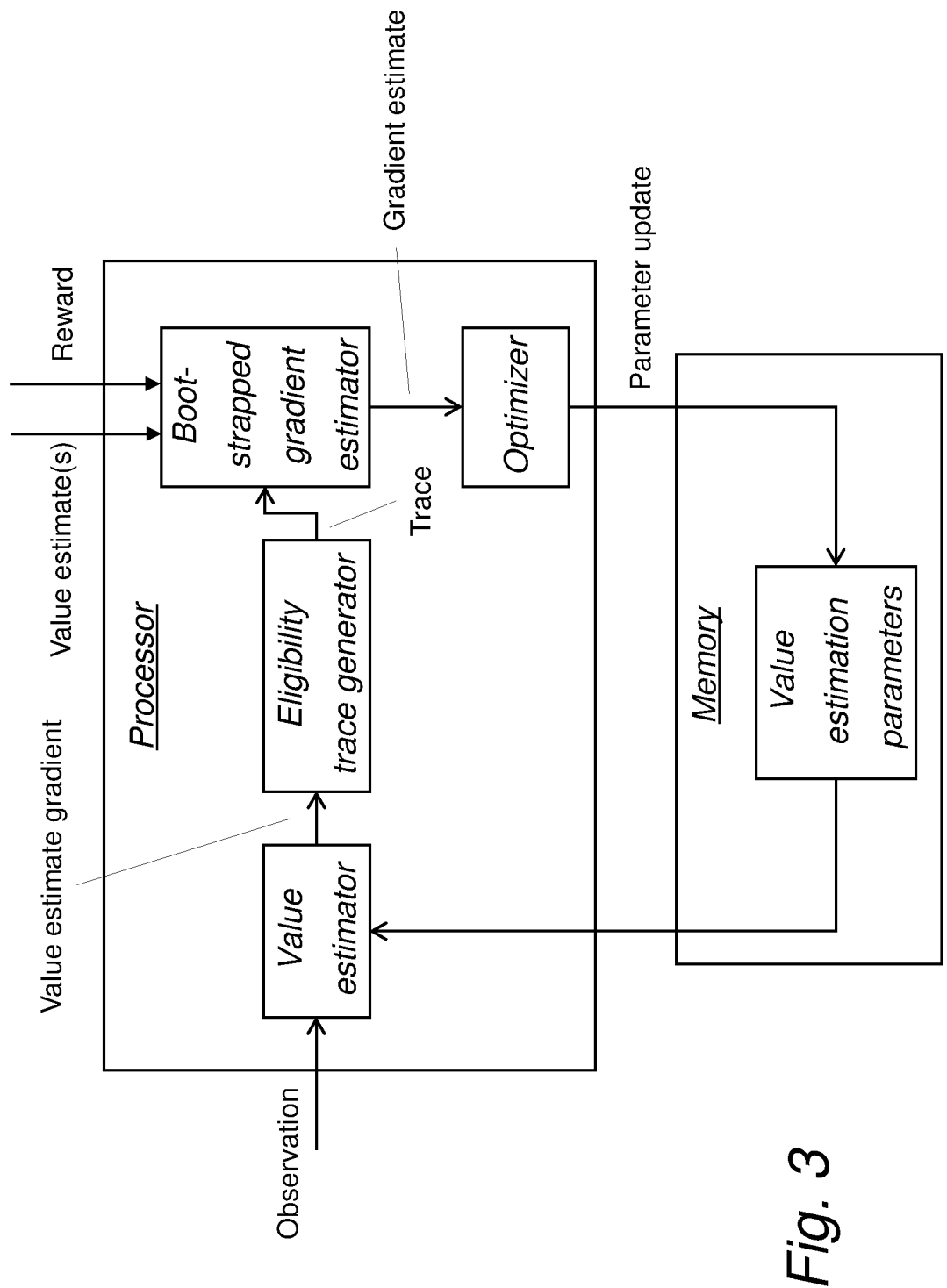
FIG. 3 is a schematic diagram illustrating another example of a processor-memory based system for reinforcement machine learning and/or value estimation therefor according to an embodiment.
Figure 4:
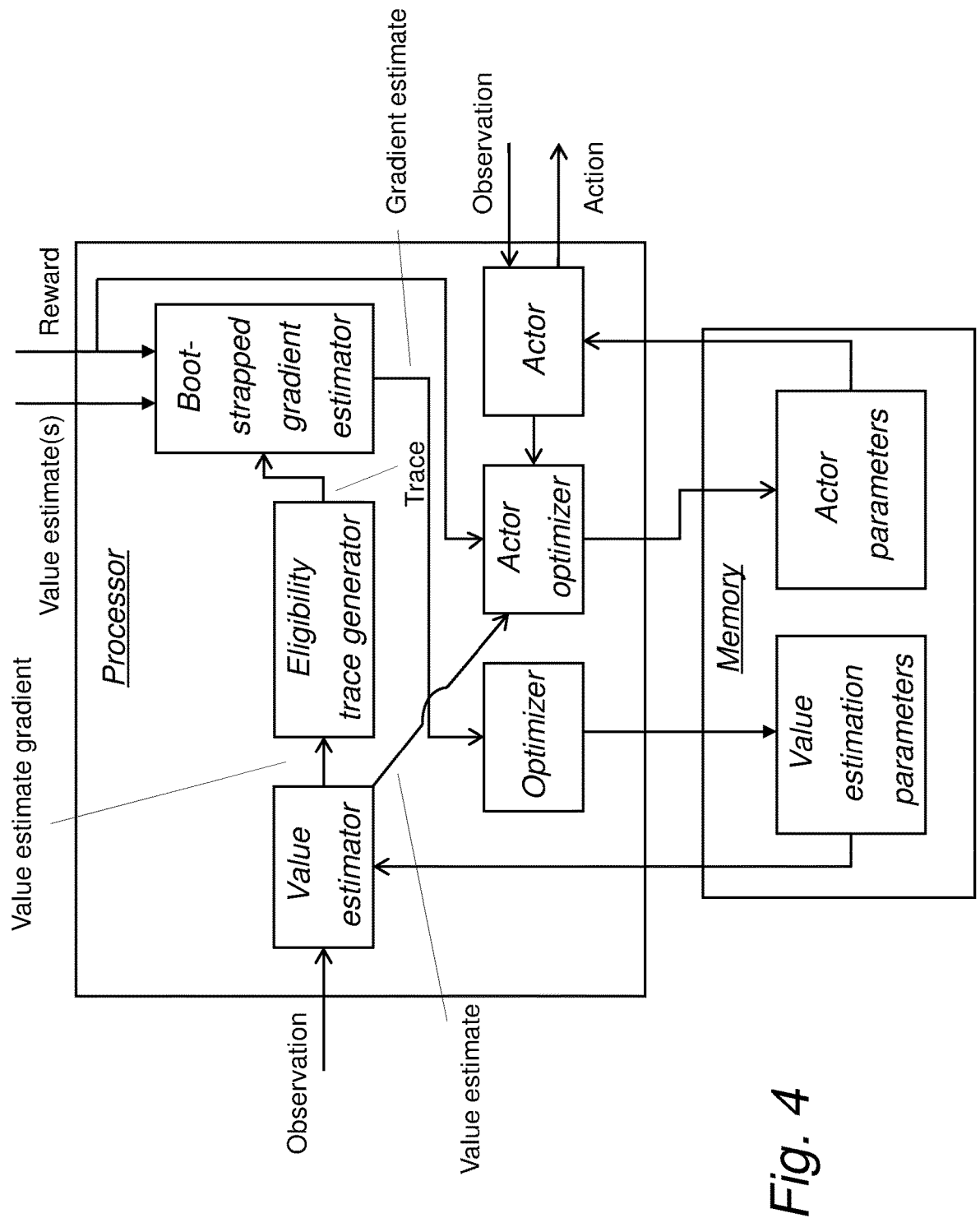
FIG. 4 is a schematic diagram illustrating yet another example of a processor-memory based system for reinforcement machine learning and/or value estimation therefor according to an embodiment.
Figure 5:
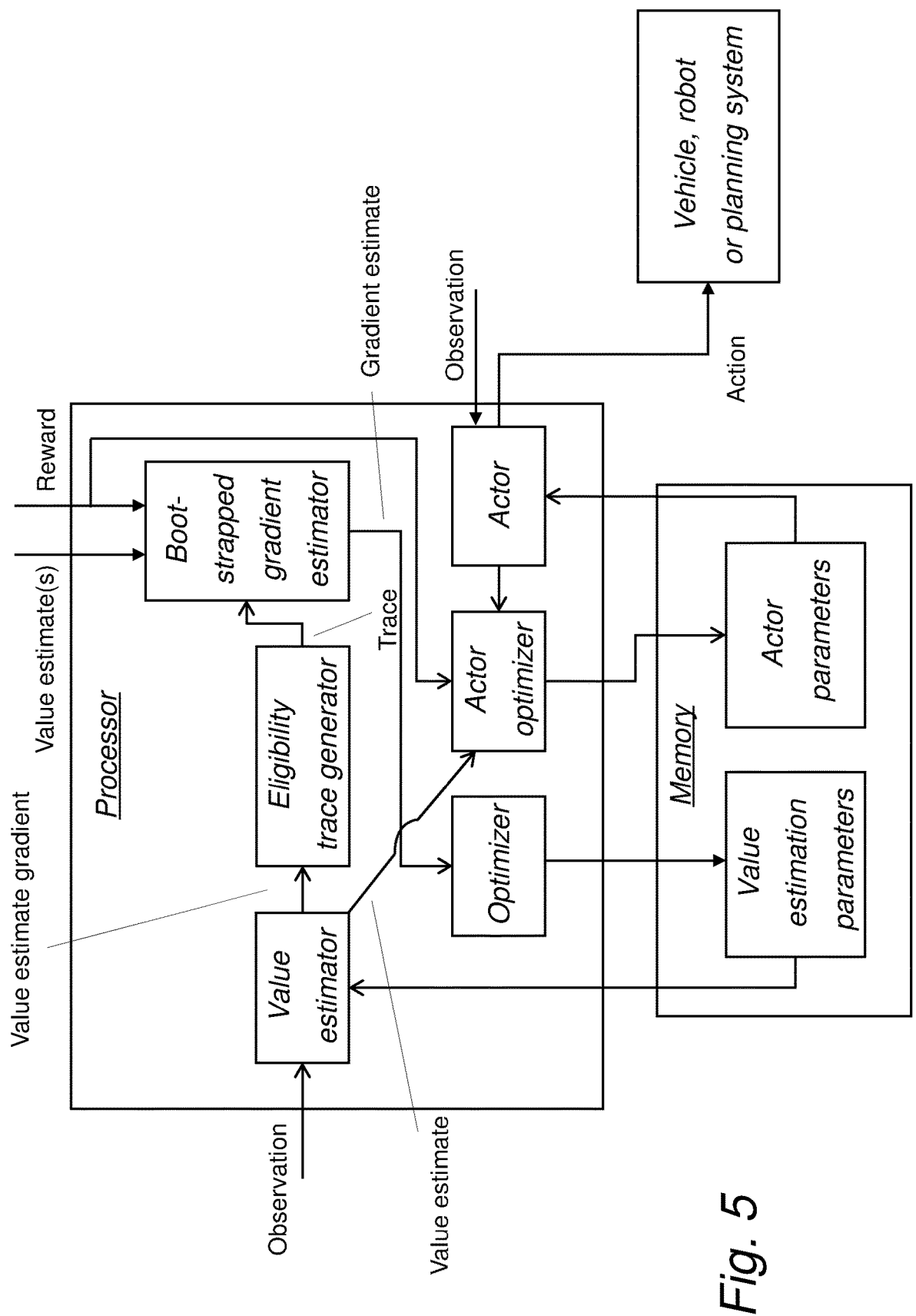
FIG. 5 is a schematic diagram illustrating still another example of a processor-memory based system for reinforcement machine learning and/or value estimation therefor according to an embodiment.

For a better understanding of the proposed technology, it may be useful to begin with a brief system overview and/or analysis of the technical problem. By way of example, reference can be made to the illustrative example of FIG. 1.

Basically, the machine learning system is based around a machine learning agent, sometimes simply referred to as an agent and in the context of actor-critic systems as an actor, which is adapted for interaction with a technical environment and/or system.

The machine learning agent normally receives a technical observation and generates an action directed to a technical environment or system (a "target technical system and/or environment"). The action is generated as a function of the observation according to some probabilistic distribution over possible actions known as a policy. This generation typically takes place in real-time in continuous implementations and for every time step in discrete implementations.

The specific policy is a distribution dependent on the observation and is encoded as one or more parameters ("actor parameters"). During the training process the agent also receives a reward which is used to update the actor parameters. The actor parameters, combined with an explicit or implicit function definition, such as a neural network structure file for a neural network library, constitute a software program code that can be executed by relevant neural network library or similar tool able to interpret the actor parameters. The actor parameters can alternatively be interpreted as a hardware architecture for a specific hardware implementation of said program code.

Expressed differently, the policy is a computer program code automatically generated by the actor optimizer and stored to the memory. This program code, together with explicit or implicit information about the functional interpretation of the actor parameter space, can be interpreted, compiled or turned into hardware equivalents by tools or systems such as a neural network framework. The functional interpretation of the actor parameter space is also called the network structure in the neural network context and is commonly stored in a separate structure file. Many classes of structures, such as recursive neural networks, are Turing complete and equivalent in expressive power to other program code for general purpose computers. The automatically generated program code is adapted to the objective defined by the reward function and the environment(s) used during training.

Depending on the application, some hyperparameters defining the structure can also be considered parameters. Specifically, it is common practice to optimize network structures using grid search, evolutionary optimization, automatic differentiation etc. Since the output in these cases is both a parameters set and a hyperparameter set describing the structure or similar they can collectively be considered an interpretable program code for a neural network framework or similar. Application of such methods in an embodiment of the invention can be considered obvious to the skilled person.

The environment is a theoretical abstraction in reinforcement learning of any subject system or combination of systems which the agent can influence with its actions and that provides a reward to the agent. The reward can be regarded as a form of technical feedback and/or connected system that gives a measurement or approximation of the objective of the agent. In agents that learn to act in the physical world, the environment usually means the whole or part of the physical universe. For an agent that is learning in a simulator the environment usually refers to the simulation. Depending on the context, the environment can also include sensors, mechanisms for calculating the reward, memory modules and many other subsystems of an embodiment of a learning machine or system. From a patent claim perspective the environment as a whole is typically not an integral element of an embodiment and the environment should not be considered a limitation for these purposes. The inclusion of an environment in the descriptions and figures herein is purely in order to maintain consistency with current practice in the field.

The observation can be any kind of signal from or information about the environment. In a typical embodiment the observation is encoded as several continuously valued inputs representative of the technical or physical environment, such as a memory array of floating point numbers. Also, binary and integers signals are common forms of observations. In fully observable environments the observation contains all the information required to define the state of the environment. Observations are typically an encoding of raw, processed sensor inputs, readings from previously stored data and/or outputs from neural networks and similar.

The action can be any kind of signal that is sent to the environment. In a typical embodiment it is either an integer encoding a specific technical or physical action to be taken with respect to the environment from a set or an array of continuously valued floating point numbers. Typically, actions are control signals that control torques for various motors, steering angles, speed, sounds, light etc. In planning systems actions control or recommend production rates, valve settings, input signals to various machines, inputs to control systems, storage levels, instructions to be sent to personnel etc.

The reward, or immediate reward, is a scalar signal that a reinforcement learning system receives and that encodes the aim the policy is being optimized for. This reward signal can in turn be calculated from several relevant data and signals encoding information such as energy efficiency, outcome, profit, achieved goals and path length. The calculation of this reward signal is usually considered to be performed by the environment and hence considered an input to an embodiment of the invention rather than an integral part of it. The reward signal can be provided continuously, at each time step and/or sparsely. Typically, the policy optimization is set to maximize reward. In maximization tasks it is common to associate positive reward signals with desired behaviour, such as reaching objectives or achieving high productivity, while negative reward signals are associated with undesired behavior, such as energy use, path length or failing an objective. For example, a reward system for a vehicle might be set to as a linear combination with negative weights for path length, a fixed negative reward for hitting any obstacle, positive weights for average velocity and a fixed positive reward for reaching the destination point.

A reward system is a technical system designed for measuring or approximating a desired objective for a system and to encode this in a reward signal. Such systems can be simple, such as giving a human operator a push button to be used when a certain goal is achieved, or complex, such as a dedicated circuit embedding logic for classifying the quality of a product on the product line using a camera system while adding factors for penalizing energy and resource expense as measured in separate sensor equipment. Reinforcement learning systems rely on appropriately designed reward systems, but the reward systems are usually abstracted into the environment since the appropriate design of such reward systems rely on technical and non-technical considerations, such as the various aspects treated in the field of operations management, that are vastly different from the considerations treated in the field of reinforcement learning.

In a different perspective, reward systems can be seen as some technical implementation of what is known in the abstract sense as a reward, in the biological field as the fitness, in genetic algorithms as the fitness function and in applied mathematics as the objective function. In most practical cases this reward system will be a very simple computer-implemented algorithm designed by a user with the technical purpose of providing meaningful measurement and efficient feedback about the effectiveness of a given machine in a given task. The technical purpose of the machine learning system is then to produce or improve a technical control system that achieves the given objective as measured by the given reward system. This reward system, typically a program code, in its entirety can then be considered an input to the machine learning process and/or system instead of just its output signal. Both this perspective of providing an entire reward system and the common perspective of providing solely the reward signal, in contrast to the reward system as a whole, as an input results in equivalent corresponding machine learning process and/or machine learning systems.

Similarly, the specification of the target technical system and/or environment the agent is to be trained in can be considered an input to the machine learning process.

The target technical system and/or environment is preferably selected by a human user in order to be identical or similar to the envisioned final target system and/or environment where the control system is to be applied, but considerations such as financial and/or computational costs for training in this system and/or environment is also relevant factors in its selection and/or design. The specification can be implicit, such as in connecting the system to a specific physical robot, or more explicit, such as providing the program code for a simulator directly to the optimizer. This is the common practice in certain existing reinforcement learning frameworks, where the program code for simulated environments follow a standardized format that can then be sent directly to the actor optimization system together with a reward function program. In certain cases, the environment is also switched automatically to a more detailed and expensive simulation in a certain point in the machine learning process.

Note that the reward and/or reward system may optionally be or comprise an intrinsic reward, i.e. a reward different from the one naively being optimized. For example, a reward system may combine an extrinsic reward encoding the energy spent with an intrinsic reward encoding the amount of new information gained, i.e. a curiosity. Another possibility is to use a value estimate from an external value estimator as reward signal to the agent. Yet other possibilities is to encode risk and/or making the balance between extrinsic reward and intrinsic reward observation-dependent, e.g. in order to reduce the tendency for exploration in certain states. Such reward systems may also depend on the parameters and learning process of the agent.

A discounted reward signal for a given time has future rewards multiplied by a factor that is decaying (i.e. decreasing) in time, which encourages prioritizing those rewards that are closer in time. Usually it is chosen to be exponentially decreasing in time. In a machine learning training process the rate of such decay may optionally be chosen to be decreasing with time or the number of training rounds or iterations, such that more distant rewards become more important as the training progresses. Maximizing the expected discounted reward is a common objective of reinforcement learning, but typically in reinforcement learning this value itself is not received nor necessarily calculated explicitly in reinforcement learning. Only the immediate reward is typically received.

FIG. 8 is a schematic diagram illustrating an example of the underlying technical setting of a trained agent adapted for interacting with a technical environment.

In the following reference will also be made to FIG. 2-FIG. 5, which are schematic diagrams illustrating different examples of a processor-memory based system for reinforcement machine learning and/or value estimation.

To improve learning a critic might be added to an agent. This addition creates an actor-critic system, where the actor is a subsystem that takes an observation and generates an action based on the actor parameters. It receives an intrinsic reward. An intrinsic reward is an (optional) signal calculated as some function of both the received reward and the critic's own value estimation. The purpose of the intrinsic reward is to be a better estimate of any change in discounted future reward for times before a given moment than the estimate given by simply measuring the immediate reward received at that given moment. In the preferred embodiment it is simply the immediate reward at a given moment plus the change in expected discounted future reward after that moment. In other words, it is the reward given plus the derivative or time step difference of the value estimate. If updated in time steps, the value estimates from different time steps might, depending on conventions used, need to be appropriately weighted in order to compensate for the time discount across the different time step.

For training purposes past observations, actions and/or rewards can be stored in a data storage and trained without sending actions to the environment at each time step. Such training is called offline training (which is not to be confused from the offline/online nature of training techniques). In these cases, the value estimate will be trained on observations, actions and/or rewards sent from a data storage rather than receiving these directly from the environment and/or actor.

In statistics, an estimator is a rule for calculating an estimate of a given quantity based on observed data: thus, the rule (the estimator), the quantity of interest (the estimand) and its result (the estimate) are distinguished. Here, an estimator is the above and corresponding devices for performing such functionality.

There are point and interval estimators. The point estimators yield single-valued results, although this includes the possibility of single vector-valued results and results that can be expressed as a single function. This is in contrast to an interval estimator, where the result would be a range of plausible values (or vectors or functions).

Estimation theory is concerned with the properties of estimators; that is, with defining properties that can be used to compare different estimators (different rules for creating estimates) for the same quantity, based on the same data. Such properties can be used to determine the best rules to use under given circumstances. The critic or value estimator is technical system that receives an observation, typically the same observation as the actor, and generates an estimation of the expected discounted reward. The value estimation is a function of the observation and a set of estimator parameters, typically the weights from and/or for a neural network. This observation is usually, but not necessarily, the same as that provided to the actor. For reasons of scalability and generalization a neural network or other differentiable estimator is usually used for value estimation. Since it is primarily some gradient of the value estimate that is of interest, any constant can be added to the estimate without affecting this gradient and any scaling applied to it will just rescale the same gradient.

In this context a 'differentiable estimator' can be any technical system taking an input and producing an output designed so that the derivative of the output with respect to the estimator parameters can be calculated automatically. In the typical implementation of the invention this is done using symbolic or automatic differentiation techniques implemented in software code, but alternatives such as computer software implementations of finite difference methods and policy are equally viable. Examples of automatic differentiation methods include source code transformations into a static code, dynamic operator overloading and compiler-based automatic differentiation. Each of these automatic differentiation approaches may use methods known as forward mode, adjoint mode, reverse mode and/or mixed mode automatic differentiation. Backpropagation is a specific example of automatic differentiation. Also manually designed technical systems for differentiation of specific value estimators are viable, especially for small and/or structurally simple estimators. Hardware implementations of such automatic calculations of the derivatives are equally viable. In the preferred embodiment the differentiable estimator is a typical universal function approximator such as an artificial neural network, a Support Vector Machine (SVM) or similar.

A differentiable value estimator is a differentiable estimator that is also a value estimator.

The value estimators used by some aspects of the invention are non-linear, which differentiates them from/against the table-based and linear mappings commonly used. Expressed differently, the gradient with respect to estimator parameters is locally non-constant across the estimator parameters space. Many non-linear estimators, such as artificial neural networks with a non-linear activation function, allow universal function approximation and good generalization. Optionally, the non-linear value estimators used by the invention are universal function approximators.

Q-learning is a reinforcement learning technique used in machine learning. The goal of Q-learning is to learn a policy, which tells an agent what action to take under what circumstances. Q-learning maintains a value estimate $Q(a, o)$ as a function of action and observation (or state. Its standard form uses iterations over all possible actions given a state and/or observations in order to find the best action. This typically makes the technique scale in complexity with the number of available actions.

Value estimation-centric learning frameworks, such as: temporal difference (TD) learning; value iteration; and Q-learning, can also be seen as a special case of actor-critics. For example, from this perspective a Q-learning algorithm combines the external observation and action into a joint observation. The critic generates Q-values from the joint observation, where Q is a value estimation based on the joint observation and the use of Q instead of V for this particular value estimate has become a convention. The actor picks the optimal action for selecting the new value estimate, although it might then apply a different action to the environment for exploration purposes. This can be viewed as a real-time training by performing a search in the action space and creating an optimal mapping from a specific observation to action. When fully trained the optimal action is usually applied to the environment as well. The resulting actor policy from this reward maximization is a partial function, since it is only defined for a single external observation. The only parameter in this case is the encoding of the optimal action given the current input. The observation in the following description may include the action and so the value estimate may also be a Q-function.

For optimizing the value estimation loss is commonly used. This value estimation loss is typically defined as the (summed) squared difference between the received discounted reward and the value estimation, but many other varieties exist. The estimator parameters can then be updated by applying some gradient descent method on this loss.

Reinforcement learning system may be treated as continuous time problems and/or discrete time problems. In the discrete time the system is assumed to change state in specific time steps. This is most common in digital computer-implemented reinforcement learning formulations, where data and/or equations are typically discreticized in time in order to be computable. Other implementations may be able to handle or approximate these directly in a continuous formulation due to inherent characteristics of the computational device. Generally, a "value at a time step" and as the "value at a moment" can be used interchangeably to refer to the value estimate at some point in time, as a continuous system can be seen as a discrete system with an infinitesimal time step size and a discrete system as a discretizised continuous system etc.

A gradient estimator is a system designed to estimate the gradient with respect to one or more parameters selected from the parameters of the value estimator. An important challenge in reinforcement learning is the efficient calculation of the discounted future reward, since only the immediate reward is typically received at each moment and the explicit storage of past states, observation and rewards is often impractical on typical hardware. The invention allows the use of eligibility traces as way to estimate the gradient on a loss based on the discounted future reward efficiently. The resulting gradient estimate vectors are an essential input to any optimizer of the value estimate.

An eligibility traces, or trace for short, is a well-known technique introduced originally for table-based learning systems, but that has since found various uses in other systems. In short, the common functionality behind these so-called eligibility traces is to keep a signal and/or memory that is decaying exponentially in time and that tracks sufficient information through time. This allows a system to store accumulated information about past states that allow the generation of updated value estimates and/or the generation of gradients on the value estimate with respect to states and/or parameters. Values are added and/or subtracted at various moments to this eligibility trace while the resulting sum undergoes an exponential decay in time.

Below is an example of an eligibility trace in a pseudocode that is applied at each time step in a discrete formulation:

trace:=trace*lambda+value where trace is the signal, lambda is the non-zero decay rate and value is the value received at that time step. The lambda variable in the eligibility trace example above is solely by convention not to be confused with the lambdas used in the descriptions elsewhere, where lambda refers to a parameter relating to the transition rate to bootstrapping (similar to how it used within the TD-lambda family of algorithms). Some embodiments of the invention described below contain several eligibility traces with non-homogenous decay rates. Further details on eligibility traces can be found in the references provided herein. For clarity, trace in the specific examples herein always refers to eligibility traces, but extension of these to related methods such as so-called "Dutch traces" may be straight-forward.

Achieving equivalent eligibility trace mechanisms, the discrete eligibility trace described above in a continuous setting is straightforward by taking the limit of small time steps and well covered in available literature. Since exponential decay is easy to achieve using a very wide range of physical mechanisms, such as chemical and/or electrical components, they allow easy and efficient implementation in many hardware implementations of the system.

Eligibility traces calculate a value we herein refer to as the "discounted sum of past" values. In other words, we sum all past values multiplied by a discount factor that decays exponentially with how far in the past each value was collected. For example:

discountsum($t$):=sum_$dt$($V(t-dt)$*gamma$^\wedge$-$dt$)

where t in this example is the current time step, V(t) is some value at time t, dt is a time difference variable being summed over, gamma is the discount factor and sum_dt is a sum over dt with all integer values between 0 and infinity (or some maximum dt, such as the start of a training episode or a time window considered sufficient sufficiently large for training purposes). In continuous system this becomes an integral. $^\wedge$-dt signifies that -dt is the exponent.

An eligibility trace may also be updated from the values of several time steps at once in a so-called batch, which will not bias the estimate if the values or appropriately weighted in the updating sum. Likewise, an eligibility trace might be used in estimating the sum of some past value by using the eligibility trace to track values up to a certain time step and then add appropriately weighted explicitly stored values for the remaining time steps in the sum of the past value. Such variations can be useful for purposes such as parallel processes and/or for improving memory caching. An example pseudocode of this follows:

trace(0):=gamma*gamma*trace(-2)+gamma*$V(t-1)$+$V(t)$ where trace(-2) here is an eligibility trace updated by adding V(t-2) instead of V(0).

There are many variations along these lines that add various terms to the sums that are obvious to the skilled person.

Eligibility traces are one of the basic mechanisms of reinforcement learning. There are two main ways to view eligibility traces. One is the more theoretical view where the traces are seen as a bridge from TD to Monte Carlo methods. According to another view, an eligibility trace is a temporary record of some subset of past values. In a sense, the trace is a selective memory that stores sufficient information about past events to allow the use of various learning algorithms in an online manner, i.e. allow techniques that do not necessarily need to repeatedly iterate over each observation in order to arrive at a single gradient estimate. This also means that the estimation can be achieved without storing these observations in memory, as only a single or subset of the states are kept in memory at any moment together with the information from the eligibility traces.

A novel method for using eligibility traces in function approximators was introduced by the inventor in the article: "A connectionist actor-critic algorithm for faster learning and biological plausibility" [Johard, Leonard, and Ruffaldi, Emanuele. 2014 IEEE International Conference on Robotics and Automation (ICRA).]. This method is called supervised eligibility traces or supervised traces and allows Monte Carlo estimation of the discounted reward. The invention can be seen as an extension of this method by the inclusion of bootstrapping.

In this earlier work, using supervised traces in particular is a memory efficient way to get an equivalent to a Monte Carlo-estimate of the value estimation loss gradient using exponentially decaying signals. Supervised traces use one signal per parameter, e2, and uses another parameter e1 for storing a trace of the value estimates that is common for all parameters. The e1 signal in supervised traces can optionally also be estimated locally for each parameter and/or subsystem in a distributed system.

The e1 signal is exponentially decaying at a certain rate, to which a signal is added that consist of the value estimate multiplied with the derivative of the value estimate with respect to the parameter in question.

The e2 signal is also exponentially decaying at the same rate, to which a signal proportional to the derivative value estimate is added.

The Monte Carlo loss gradient for the parameter in question can then be estimated from these signals, for example by subtracting the e2 signal multiplied with the reward from the e1 signal.

A further study by the inventor revealed that only the e2 signal is strictly needed to be an actual eligibility trace in the supervised traces in order to achieve the primary computational and/or memory advantages. The contribution of the e1 signal from the value estimate and its gradient at a specific moment to the gradient of the value estimate becomes a geometric sum to infinity for each parameter that only depends on the current value estimate and its gradient. The whole contribution of such geometric sums is easily evaluated immediately from the decay rate, the current value estimate and the current gradient of the value estimate, resulting directly in a term proportional to the value estimate multiplied by its gradient. However, allowing this contribution to the sum to unfold through the use of an eligibility trace also allows convenient truncation of time series in problem settings with finite number of state transitions in each rollout, i.e. in settings where the sum is only desired up to some certain maximum future time step. The use of an eligibility trace for e1 is optional and appropriate in such settings. This concludes the analysis of this earlier work by the inventor and the definition of the traces e1 and e2 below may differ.

Bootstrapping is a methodology in statistics that uses an estimated value to estimate other estimates. Our proposed system applies bootstrapping to a Monte Carlo estimate related to the concepts used in supervised traces by performing gradient ascent and/or descent on some combination comprising the reward and a value estimate. This combination defines the introduction of bootstrapping in the Monte Carlo estimate in a recursive manner or through an equivalent differential formulation in the continuous case. Any discounted future reward estimate generated from a value comprising a combination of the value and reward is called a "bootstrapped value estimate". A technical system generating the bootstrapped reward is referred to as a "bootstrapper".

According to a first aspect, there is provided a system for supporting machine learning. The system comprises:
one or more processors;
a memory configured to store one or more parameters of an estimator;
a differentiable estimator of discounted reward, the differentiable estimator also being referred to as a value estimator, configured to, by the one or more processors: receive an observation including information representative of one or more observations of an environment and/or system at a moment in time, access parameters of the value estimator from the memory and generate a discounted reward estimate, also referred to as a value estimate, in a value estimation process;
one or more eligibility trace generators configured to, continuously and/or (e.g. repeatedly or iteratively) through several steps and/or moments of the eligibility trace generator and by the one or more processors: receive from the value estimator a partial derivative of the value estimate with respect to one of the parameters of the value estimation process; receive a signal from the eligibility trace generator and generate an updated signal, also referred to as an eligibility trace, such that each step and/or moment comprises operations such that:
the signal is decaying in real or simulated time at a rate proportional to the respective signal, i.e. exponential decay in time corresponding to the observation;
to the signal is added a value proportional to the partial derivative of the value estimate;
thereby maintaining or keeping a signal, between steps and/or moments of the eligibility trace generator, by values being added and/or subtracted at various moments to the eligibility trace while the resulting sum undergoes an exponential decay in time; and
one or more bootstrapped gradient estimators configured to, by the one or more processors: receive a reward signal from a technical reward system; receive the value estimate; receive the eligibility trace; and create a gradient estimate based on an input comprising: the reward; the eligibility trace; the value estimate; and the gradient of the value estimate.

In a sense, it can be said that the signal persists between steps and/or moments of the eligibility trace generator.

By way of example, it is possible to generate a set of eligibility traces, where the eligibility traces can be regarded as a mechanism and/or intermediary signal(s) used to generate the gradient estimate.

A notable step here is the (additional) use of the gradient directly, rather than solely indirectly through the eligibility trace as is the case in the TD-lambda algorithm.

By way of example, the one or more bootstrapped gradient estimators may be configured to generate the gradient estimate in a process comprising adding and/or subtracting each of:
a signal proportional to the value estimate multiplied by the partial derivative of the value estimate and with that product being separable from the value estimate multiplied with the eligibility trace;
a signal proportional to the eligibility trace multiplied by the reward; and
a signal proportional to the eligibility trace multiplied with (a sum comprising) the value estimate and/or another value estimate, with the value estimate(s) in this signal being for the same or a following moment.

For example, the value estimator may be based on a non-linear function. In other words, the value estimator may be a non-linear value estimator.

Optionally, the one or more bootstrapped gradient estimators is/are configured to, by the one or more processors, create the gradient estimate based on an input further comprising a value proportional to a linear combination of: the discounted sum of the past reward and optionally any value estimate.

For example, the one or more bootstrapped gradient estimator may be configured to generate the gradient estimate in a process comprising adding and/or subtracting each of:
a signal proportional to the value estimate multiplied by the partial derivative of the value estimate;
a signal proportional to the eligibility trace multiplied by the reward (e.g. received in a discounted time window, at a time step or at an instant);

a signal proportional to the eligibility trace multiplied with variable V2, V2 being the same value estimate or another value estimate, for the same or a future moment;

and wherein the gradient estimator further generates a correction signal directed to any gradient estimate and/or optimizer of V2 comprising each of the following terms separately and/or summed together in any combination(s):

a signal proportional to the discounted sum of the past value estimate multiplied with the partial derivative of V2 at the same or a future moment;

a signal proportional to any eligibility trace (e.g. updated with the partial 780 derivative of V2 at same or future moment) multiplied by a discounted sum of V2 (at the same or a future moment); and a signal proportional to any eligibility trace (e.g. updated with the partial derivative of V2 at the same or a future moment) multiplied by a discounted sum of the past reward.

In another example, the one or more bootstrapped gradient estimator generates the gradient estimate in a process comprising adding and/or subtracting each of:

a signal proportional to the value estimate multiplied by the partial derivative of the value estimate;

a signal proportional to the eligibility trace multiplied by the reward; and a signal proportional to the eligibility trace multiplied with variable V2, V2 being the same value estimate or another value estimate, for the same or a future moment;

and wherein the gradient estimator further generates a correction signal directed 795 to any gradient estimate and/or optimizer of V2 comprising each of the following terms separately and/or combined/summed together in any combination(s):

a signal proportional to the discounted sum of the past value estimate multiplied with the partial derivative of V2 at the same or a future moment;

a signal proportional to the partial derivative of V2 multiplied by a discounted 800 sum of the past reward.

a signal proportional to the reward multiplied by the partial derivative of V2 a signal proportional to the partial derivative of V2 multiplied by V2.

a signal proportional to any eligibility trace multiplied by the partial derivative of V2

As an example, the value estimator may be based on a non-linear function.

In our provided pseudocode the same moment (time step) referred to above is the variable V_0 and the following moment is the variable V_1. These may collapse to the same variable in continuous time implementation (hence "same or following moment"). Note that the "following moment" is not necessarily one time step ahead, but may be multiple time steps (or a certain amount of continuous time) ahead of the time referred to as the "same moment". In multiple step implementation the time steps in between may also have to be handled explicitly by adding other corresponding terms to gradient estimate.

Optionally, the system further comprises one or more optimizers configured to, by the one or more processors: receive the gradient estimate, receive one or more parameters controlling the functioning of any value estimator; and generate updated parameters; and store the new parameter(s) in the memory.

For example, two or more parameters controlling the functioning of a value estimate are updated:

without estimating a value for each combination of individual parameter, i.e. without computing any matrices with all combinations of parameters and hence allowing a memory and/or computational complexity less than quadratic in the number of parameters; and without storing in memory each observation and/or state used to calculate by the eligibility trace the discounted sum of past derivates of the value estimate.

Note that the sums of signals used in the descriptions of the invention are fully sufficient to generate a gradient estimate in themselves. This provides the possibility to rely solely on these sums while avoiding the additional computational and/or memory overhead of alternative gradient estimation methods that are using matrices with values all parameter combinations and/or storing past states to arrive at the gradient estimate. The additional overhead of these alternative estimation mechanisms has widely been assumed to be unavoidable, and avoiding them is a substantial benefit provided by the invention. However, these additional overheads may still be justifiable in other aspects of the invention, where the computational and/or memory advantages are not critical. One such example is when the past states will be reused for visualization or further analysis of system dynamics in small systems.

In a particular example, the system further comprises:

a memory configured to store actor parameters controlling the functioning of one or more technical actors;

one or more actors configured to, by the one or more processors: receive an actor observation; access one or more actor parameters in the memory; and generate an action directed to a technical system;

an actor optimizer configured to, by the one or more processors: receive the observation; receive the action; access the actor parameters in the memory; receive the value estimate from the value estimator; receive the reward signal; generate updated actor parameters; and store the updated parameters in the memory.

In the above example, the value estimator may comprise an artificial neural network. The system may for example be configured for fully or partly controlling a technical system and/or technical environment by the action(s) of the actor(s).

For example, the technical system and/or environment to be controlled may include a vehicle, robot or technical planning system.

Figure 6:
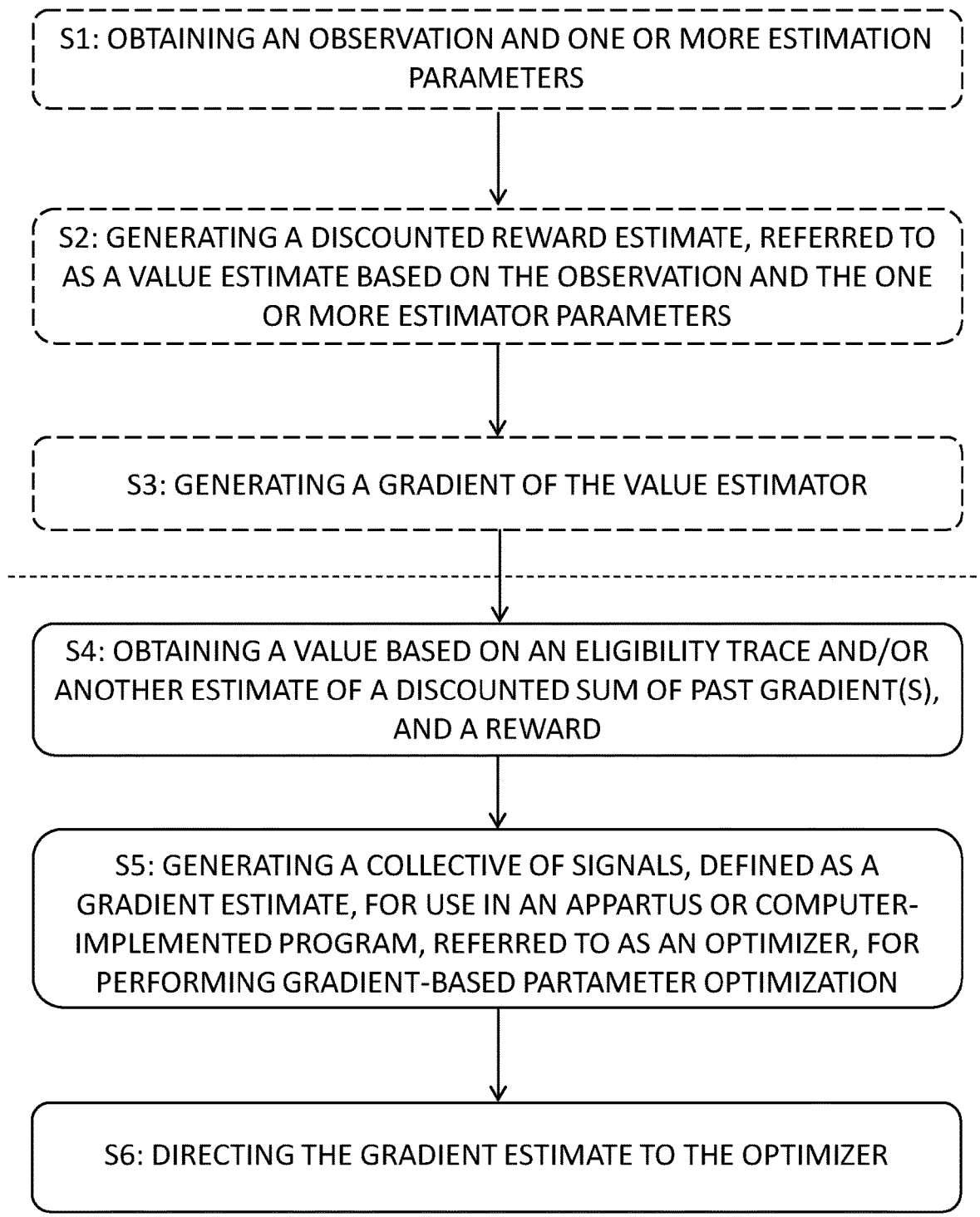
FIG. 6 is a schematic flow diagram illustrating a computer-implemented and/or apparatus-implemented method for supporting machine learning according to an embodiment.

FIG. 6 is a schematic flow diagram illustrating a computer-implemented and/or apparatus-implemented method for supporting machine learning according to an embodiment. Alternatively, the method is regarded as a procedure for determining parameters of a neural network for the purpose of value estimation in a machine learning system. The method can be divided into two phases, defined by i) steps S1-S3 and ii) steps S4-S6, which can be performed individually and/or in combination. Depending on how the method is used, the first phase defined by steps S1-S3 may be regarded as optional.

Basically, the method comprising the steps of:

S1: obtaining: an observation from a technical system and/or environment; and one or more estimator parameters;

S2: generating a discounted reward estimate, referred to as a value estimate, by a technical differentiable estimator, referred to as a value estimator, based on the observation and the one or more estimator parameters;

S3: generating an estimate of the gradient of the value estimate with respect to one or more estimator parameters of the value estimator, this estimate being referred to as a gradient of the value estimator;

S4: obtaining: a value based on an eligibility trace and/or another estimate of a discounted sum of past gradient(s) of a value estimator, for each of one or more of the value estimator parameters; and a reward as part of technical feedback from a technical system and/or environment; and optionally any additional value estimate;

S5: generating a value estimator gradient estimate, for use in an apparatus or computer-implemented program for performing gradient-based parameter optimization of a value estimator, referred to as an optimizer, based on each of the following signals:
- a value proportional to: the value estimate multiplied by the gradient of the value estimate with respect to the weights such that this value is also separable from any contribution to the gradient estimate that is proportional to the value estimate multiplied by the discounted sum of past gradient(s);
- a value proportional to: the reward multiplied by the eligibility trace and/or a value proportional to the other estimate of the discounted sum of past gradient(s);
- a value proportional to: the eligibility trace and/or a value proportional to 905 the other estimate of discounted sum of past gradient(s) multiplied by variable V2, V2 being any value estimate, for the same or a following moment or time step; and S6: directing said gradient estimate to said optimizer.

Alternatively and/or complementary, step S5 involves generating each of the above signals, collectively defined as the gradient estimate, separately and/or combined/summed together in any combination(s).

In a particular example, the value obtained in step S4 is an eligibility trace and/or another estimate of a discounted sum of past gradient(s), for each of one or more of the estimator parameters; and a reward as part of technical feedback from the technical system and/or environment; and optionally any additional value estimate. The gradient estimate comprises each of the following signals, separately and/or combined/summed together in any combination(s):
- a value proportional to: the value estimate multiplied by the gradient of the value estimate with respect to the weights such that this value is also separable from any contribution to the gradient estimate that is proportional to the value estimate multiplied by the discounted sum of past gradient(s);
- a value proportional to: the reward multiplied by the eligibility trace and/or a value proportional to the other estimate of the discounted sum of past gradient(s);
- a value proportional to: the eligibility trace and/or a value proportional to the other estimate of discounted sum of past gradient(s) multiplied by variable V2.

In other words, a collective of the above signals, defined as the gradient estimate, is generated and directed to the optimizer, e.g. by sending or forwarding the generated gradient estimate to the optimizer.

An implication of using the proposed gradient estimate is that it is possible to generate gradient estimates using only past values in the time of the observation, for example those values generated efficiently by eligibility traces. Use without eligibility traces, such as methods storing the values necessary for the discounted sums explicitly in memory rather than implicitly through eligibility traces, provides lesser but still significant technical benefits. For example, we can generate the gradient estimate online without an expensive backpropagation pass that can only be started after a rollout is complete.

Optionally, the method further comprises:
extending the gradient estimate with, or directing toward any gradient estimate and/or optimizer for the other gradient estimator for V2, the following signals separately and/or combined/summed together in any combination(s):
- a value proportional to: the discounted sum of the past value estimate multiplied by the gradient of V2 for the same or a following moment; and
- a value proportional to: the product of the discounted sum of the past gradient of V2 multiplied by V2, both terms being for the same time moment or a following moment; and
- a value proportional to: the product of the discounted sum of the past gradient of V2, V2 being for the same or a following moment, and the reward.

When V2 is different from the differential estimator, the gradient of V2 also needs to be obtained. Optionally, V2 is generated using a differentiable estimator.

Note that the gradient-related values will generally be vector values or other non-scalar values, such as tensors, when more than one parameter is taken into consideration. The terms can be summed together and/or otherwise manipulated in any combination(s) where the signal(s) maintain the usability in an optimizer (i.e. such that the whole sum of all terms may eventually be summed with the parameter values). In a particular example, a linear transform can be used to generate one or more signals, where a linear transform of these signal(s) can later be used to result in the sum of the above six terms. Various such variants can easily be derived by basic linear algebra and use our provided pseudocode as guidance for setting the appropriate parameters of the transforms. In case the value estimator is used as V2, all six terms directed to the gradient estimator, i.e. the three first ones and the three optional ones above, can similarly be summed together in any combination.

The various terms in the sum that are proportional to the discounted sum of some past value are not necessarily calculated using the same mechanism. They may rely on different mechanisms, such as using different eligibility traces and/or different explicit sums and/or other mechanisms while still achieving the objective of estimating or calculating a value proportional to the discounted sum of past values (e.g. the discounted sum of the past gradient).

For example, the extending signals except the discounted sum of the past value estimate may be generated from another value estimator and directed to a gradient estimate for that other value estimator.

Optionally, steps may be applied continuously and/or repeatedly; and the obtained value in step S4 may change in order to correspond to a change in a system and/or environment in real and/or simulated time.

By way of example, the output of the value estimator may be a non-linear function of its inputs. In particular, it might be a universal function approximator.

As an example, the eligibility trace obtained may be decaying at a rate in real or simulated time proportional to the eligibility trace and is increased based on the gradient of the value estimate at one or more time steps; and the method further comprises the steps of:
obtaining: the estimate of the gradient of the value estimate with respect to the value estimator parameters; and
updating, for each of one or more received value estimator parameter, the corresponding eligibility trace such that the eligibility trace is proportional to the discounted sum of the past gradient of the value estimate.

By way of example, the gradient estimate is calculated without storing simultaneously in memory every observation of relevance to the gradient estimate, i.e. the gradient is estimated online.

Optionally, the method may further comprise the step of updating one or more value estimator parameters based on the gradient estimate.

As an example, the value estimation parameters may encode a neural network.

Optionally, two or more value estimator parameters may be updated while updating less than one value per parameter pair (i,j), i.e. the parameter updating allows a sub-quadratic computational complexity in the number of parameters.

In a particular example, the method comprises:
  obtaining the parameters of a technical actor system; and an actor observation;
  generating an action from the actor parameters and the observation; and
  optimizing the actor parameters of the technical actor system.

By way of example, the method may further comprise the step of controlling the technical actor system at least partly based on the generated action.

For example, the technical actor system to be controlled may include a robot; vehicle; or technical planning system.

Preferably, the method may be a computer-implemented method.

According to another aspect, there is also provided an apparatus for reinforcement learning configured to perform the method as described herein.

According to yet another aspect, there is also provided a self-learning control system for a controllable technical system, wherein the self-learning control system comprises a system for supporting machine learning or an apparatus for reinforcement machine learning as defined herein.

According to a further aspect, there is provided a method for at least partly assembling and/or configuring a fully or partially automated robot and/or vehicle. The method comprises:
  configuring one or more processors of the robot and/or vehicle according to determined/optimized actor parameter(s); or
  including in the robot and/or vehicle one or more processor(s) designed and/or configured according to determined/optimized actor parameter(s).

In this way, it is possible to provide efficient assembly and/or configuration of a fully or partially automated robot and/or vehicle.

According to still another aspect, there is provided a method for performing an at least partially automated industrial process, wherein the industrial process is conducted based on control signal(s) from a technical planning system as defined above.

In this way it is possible to, e.g. efficiently generate products of an automated industrial process.

In the following, the proposed technology will be described with reference to non-limiting examples:

Let us first consider the update used by TD(0) (here described in a time step problem setting but easily transformable to a continuous setting):

$$\text{Sum}\_i \; \text{error}\_i$$

where $$\text{error}\_i = V\_0 - r\_0 - \text{gamma} * V\_0$$

where $V\_0 = V(i+0)$ is the value estimate at that time step as a function of some observation ((o) is in the following text mostly omitted in our notation for brevity), r_0, also herein called simply r, is the reward received after time step i+0, and sum_i is a sum over one or more time steps.

Notation herein is for reference loosely based on LaTeX with may of the special characters omitted. For example, ^ designates an exponent, _ is subscript etc. In another example, sum_{a=0}^b is the sum of a from 0 to b.

This is an error of the TD(0) type used to update weights, which is not related to a proper loss function, but there are modifications to temporal difference error which make it such.

Sums over one or more time steps using an update rule are in the following notation implicit and we focus in the following notation on the update being performed at each time step and/or at each moment. Note that the use of a "time step" herein does not necessarily refer to a discrete time implementation, but might also refer to a specific moment in continuous time embodiments.

Note that the error and/or loss function in TD(0) or its gradient-based varieties explicitly uses a time window of one time step as a window for the bootstrapping, with any further propagation of error signals being applied indirectly through multiple TD(0) updates. In the preferred embodiment of the bootstrapped gradient estimator we would like to take a weighted average over several time windows of different types, where larger windows are weighted less according to an exponentially decaying weight as a function of the time window.

We can describe this as a proper loss function:

$$\text{loss} = \text{sum}\_i \; \text{error}\_i{^2}$$

where $$\text{error}\_i = \text{sum}\_\text{tau} \; \text{lambda}{^\text{tau}} * (V\_0 - \text{sum}\_(t=0){^\text{tau}} \; \text{gamma}{^t} \; r\_\text{tau}) - \text{gamma}{^\text{tau}} \; V\_\text{tau})$$

where subscripts for V and r again means V(o(i+tau)) etc. Considerations of border conditions etc have been omitted for simplicity. Tau is used as an index (within a time window within which Monte Carlo sampling is used) and lambda is a parameter describing the weighting of different time windows lengths.

The invention also works for various other error definitions, such as:

$$\text{alt\_error}\_i = \backslash\text{sum}\_\{\text{tau}=0\}(\text{lambda}^\{\text{tau}\} V\_0 - \text{sum}\_\{t=0\}^\{\text{tau}\}(\text{gamma}^t \; r\_\{t\}) - \backslash\text{gamma}^\text{tau} \backslash\text{gamma} \; V\_\{\backslash\text{tau}+1\})$$

but we do not treat them in detail here as the complexity will be higher for no obvious advantages in most cases. However, they can be derived in a straightforward fashion from the descriptions herein. For example, the alternative loss function above can generate a gradient estimate consisting of 20 terms, with this set including the specific necessary terms described herein as a subset.

Three notable equivalences that can aid in the design of the invention are the following:

$$\text{sum}\_i \; \text{sum}\_j \; f(i,j) = \text{sum}\_i \; \text{sum}\_\{j=i\} f(i,j) + \text{sum}\_j \; \text{sum}\_\{i=j\} f(i,j) - \backslash\text{sum}\_i \; f(i,i)$$

and $$\text{sum}\_i \; \text{sum}\_j{'i} = \text{sum}\_j \; \text{sum}\_(i=j)$$

and $$\text{sum}\_i(f(i) \text{sum}\_t(x{^t} \; g(t)) = \text{sum}\_i \; g(i) \text{sum}\_j{'i}(x{^j} \; f(j))$$

where the last factor can be described recursively as:

$$\sum_j \hat{i}(x\hat{j} f(j)) = t\_n$$

where $t\_n = f(n) + x\, t\_\{n-1\}$

The technical interpretation of these relations in the context of the invention is that: 1) sums of sums can be rewritten as three iterable sums of factors depending only on current and past values, i.e. factors not relying on future values, and 2) a discounted sum of past values can be calculated recursively using an eligibility trace without explicitly storing past values. These equalities represent mechanical tricks that allow us to avoid the expensive storage of information while maintaining strict equality to the desired gradients and may also be used with the instructions herein by the skilled person in order to derive many alternative designs of the invention from various desired loss functions. The derivation of proper constants is generally straightforward through an expansion of a loss function. The equalities listed above may aid in shaping the terms into the desired form corresponding to eligibility traces. The preferred embodiments below provide precalculated designs that cover most use cases.

In a truncated rollout, i.e. where we have some maximum final time step, the error needs to be modified, as rewards after the rollout will not be available. The case of a truncated rollout can, in short, be handled by using the final value estimate to replace actual rewards received after the last time step in the rollout, i.e. the sum in the error goes to either tau or the maximum time step, depending on which is reached first. This will lead to an increased importance of the last value estimate in the forms of a geometric sum. This means that the final value estimate can be replaced with this geometric sum, which is easily calculated by the skilled person. In other words, the update rule is modified by scaling the value estimate in the final time step, but otherwise identical for the truncated case. Examples in a preferred embodiment follow in the pseudocode below.

In particular, a careful study by the inventor reveals that a gradient estimate of the loss function above with respect to the parameters of the value estimator can be calculated using the following mechanisms:

$e1 := \text{lambda} * e1 + V0 * d/dw(V0)$ $eV\_0 := \text{gamma} * \text{lambda} * eV\_0 + V\_0$ $edV\_0 := \text{gamma} * \text{lambda} * edV\_0 + d/dw(V\_0)$ $eV\_1 := \text{gamma} * \text{lambda} * eV\_1 + \text{gamma} * V\_1 + \text{sigma} * r\_0$ $edV\_1 := \text{gamma} * \text{lambda} * edV\_1 + \text{gamma} * d/dw(V\_1)$ $\text{grad\_w} := \text{sigma} * e1 - \text{sigma} * (\text{sigma} * r\_0 + \text{gamma} * V\_1) * edV\_0 - \text{sigma} * \text{gamma} * eV\_0 * d/dw(V\_1) + eV\_1 * edV\_1$ where w is a vector of value estimate parameters (also known as the "weights").
grad_w is the gradient estimate of the value estimator
V_O is the value estimate V(o(t), w) at the (current) time step t
V_1 is the value estimate for the next time step t+1
r_0 is the reward r(t+0) given at the end of time step t
o(t) is the observation received at time t
lambda is a parameter controlling the transition rate from Monte Carlo estimate to bootstrapping.
gamma is the discount rate per time step for the reward sigma depends on lambda as sigma:=1/(1−lambda)
:=is the assignment operator
(Subscripts in the names of eligibility traces eV_1 etc, unlike in V and r where they denote time steps or moments, are purely a naming convention for eligibility traces used here to demonstrate their connection to their respective values.)

Alternatively, we may for example also use the following update rule better adapted for finite rollouts:

$e1 = \text{gamma} * \text{lambda} * e1 + 1$ $e2 = \text{gamma}^2 * \text{lambda}^2 * e2 + 1$ $e1V\_0 = \text{gamma} * \text{lambda} * e1dV\_0 + V\_0$ $e1dV\_0 = \text{gamma} * \text{lambda} * e1dV\_0 + d/dw\, V\_0$ $er1 = \text{gamma} * \text{lambda} * e1r + r * e1$ $e1dV\_1 = \text{gamma} * \text{lambda} * e1dV\_1 + \text{gamma} * e1 * d/dw\, V\_1$ $e1V\_1 = \text{gamma} * \text{lambda} * e1V\_1 + \text{gamma} * V\_1\, e1$ $\text{grad\_w} = \text{sigma}^2\, V\_0\, d/dw(V\_0) - \text{sigma}*(\text{sigma}*r + \text{gamma}*V\_1)*e1dV\_0 - \text{sigma}*\text{gamma}*eV\_0\, d/dw(V\_1) + \text{sigma}*\text{gamma}*d/dw(V\_1)*er1 + \text{sigma}*edV\_1*r - \text{sigma}*\text{gamma}*e2*r*d/dw\, V\_1 + \text{gamma}\, V\_1\, edV1 + \text{gamma}*d/dw\, (V\_1)*eV\_1 - e2\, \text{gamma}^2\, V\_1\, d/dw\, V\_1$ when generating the final gradient estimate for a truncated rollout, we replace V_1 with sigma V_1 in the final iteration of the steps above.

The above gradient has been rescaled by ½ for simplicity of notation, since the magnitude of the gradient estimate does not significantly a gradient descent scheme.

Optionally, the update rule above may, as has been mentioned, be repeated several times with new values for i. For example V_0 may refer to a new time step V(i), r refers to r(i), V_1 refers to V(i+1) (etc) in each step i of such iterations.

Note that time indications herein such as "current time step", "same moment", "next time step" and "a future moment" etc only implies the relative ordering of these two time steps (i.e. the relative time of the state of the environment generating the corresponding observation and reward) and do not exclude offline calculation and/or necessary imply any other relation between the data points and the timing of the generation of signals etc. The affected variables can be assumed, for brevity, to be for the same time step unless otherwise mentioned and the pseudocode can be used as an indication in case of any ambiguity. The time step of the reward is implicitly also in relation to these steps, as indicated in the pseudocode.

In a particular example, we can use a unique combination of different eligibility traces in order to generate the gradient estimate. Note that we can perform the whole optimization exactly given any lambda using only d/dw V(0) and d/dw V(1), i.e. values momentously available when updating the environment from t to t+1. It is possible to generate a single series of updates to the environment and learn online. Scaling is proportional to n with a fixed memory requirement, while it takes into consideration value estimates potentially infinite number of steps ahead in updating each value estimate.

WO 2018/211139 A1 relates to reinforcement learning, where a reinforcement learning neural network selects actions to be performed by an agent interacting with an environment to perform a task in an attempt to achieve a specified result. The reinforcement learning neural network has at least one input to receive an input observation characterizing a state of the environment and at least one output for determining an action to be performed by the agent in response to the input observation. The system includes a reward function network coupled to the reinforcement learning neural network. The reward function network more or less corresponds to a value estimator, and has an input to receive reward data characterizing a reward provided by one or more states of the environment and is configured to determine a reward function to provide one or more target values for training the reinforcement learning neural network.

WO 2018/211139 A1 mentions a lambda network, but this lambda network cannot be regarded as an eligibility trace generator, e.g., as the lambda network in its forward operation does not make use of the derivatives of the value function. The training of the lambda network, on the other hand, depends on the gradient with respect to parameters of future values of the value estimate (in the time corresponding to the observation) and not of past values of the value estimate (in the same time), as can be seen in the derivation of the discounted return.

Generating a gradient requires knowledge originating both in the current time step (in the time of the observation) and in other time steps. The eligibility traces is a finite-dimensional information encoding that stores all the necessary information from other steps and that depends only on the current eligibility trace and a finite set of values depending on the current value estimate (and optionally one or more previous time steps). In other words, we can calculate the gradient without storing a large dynamically sized, and potentially infinite, series of past and/or future values using the invented information encoding mechanism corresponding to the eligibility trace.

The "persistence" (maintaining or keeping the trace) of the eligibility trace between moments of its application to the gradient estimates is a distinguishing feature of the invention. In clear contrast, WO 2018/211139 A1 discards its discounted signals used in generating the gradient estimate for a time step when it starts to generate a gradient estimate for the next time step.

A direct implication of having the eligibility trace generator as a block before the gradient estimator is that the gradient estimator may use the output of the eligibility trace generator as part input for generating the gradient estimate. This avoids the necessity of the solution in WO 2018/211139 A1 to 1) store; and/or 2) regenerate, for each gradient estimate, all the corresponding values for these other time steps. Another proposed mechanism in WO 2018/211139 A1 is to limit the return to an approximate finite m-step return, which obviously requires an undesirable trade-off between accuracy of the training and computational and/or memory complexity.

Summarizing the technical arguments above, for generating a gradient estimate by using a unique combination of eligibility traces and bootstrapping to generate a gradient estimate, the present invention has better computational efficiency compared to the method in WO 2018/211139 A1. The proposed technology is therefore also capable of processing input from larger and more complex technical system and/or environments.

The pseudocode describes aspects of the preferred embodiment of the invention when implemented in a general purpose computer.

The general principles described in the pseudocode can easily be transformed into preferred embodiments in the continuous case and/or embodiments that balance the memory and/or computation characteristics most relevant to the desired hardware and/or other considerations.

The first two terms in the sum of the pseudocode have some similarities with a TD-lambda update with function approximation. The next two terms constitute correction terms that makes the sum a gradient on an objective function, which improves the convergence properties. The computational complexity of the correction term scales exactly or approximately linearly with the number of parameters. This separates if from many gradient TD-algorithms, e.g. RLS-TD, that maintain a matrix with at least quadratic scaling in complexity as a result.

The trace eV_1 in the example pseudo code calculate a discounted sum of both the past reward and the past V_1 estimates in a single trace, which can be used to directly generate the sum of the two corresponding terms sharing a factor.

The eV_0 and/or eV_1 traces are common for all parameters and only need to be evaluated once for the value estimator. This removes the necessity to evaluate them locally, although this might be a more suitable option in certain implementations depending on the balance between factors such as the signal transmission costs and the cost for additional local traces. Their computational costs in a general purpose computer implementation are generally not limiting the performance due to them only being evaluated once, unlike the other traces that need to be evaluated for each parameter. For this reason it might be an option to use more expensive computation options for these, such as storing precise past value estimates and evaluate the eligibility traces at each time step. An equivalent value to eV_1 can then explicitly computed as a discounted sum of the past V2 estimate (or V if V=V2) and the reward. The specifics of setting up such a combination will be obvious to the skilled person after explicitly describing the sums being tracked by the eV_1 trace.

Note that this gradient estimate becomes accurate when summed over a large 1330 number of time steps, but that each estimate and/or component of the estimate can be sent to the optimizer individually as is typical in various online gradient descent mechanisms.

The above implementation has been kept simple for brevity, but there are many minor changes and/or improvements, such as (in cases where V_0 and V_1 are generated using the same estimator) avoid storing the edV_1 as this is similar to edV_0 but for a time delay. We can then store the older value edV_0 and perform the update steps from information obtained from the current time steps to regenerate edV_1 wherever needed. Alternatively, by keeping traces proportional to r and eV_0, we do not necessarily need to store eV_1 (again assuming they are generated by the same value estimator). This is because eV_1 can be recalculated easily from information obtained in the current time steps as a sum of eV_0, V1 and a trace proportional to r. Since such modifications will come easily to a skilled person these have been omitted from the above pseudocode for the benefit of brevity and clarity.

In a specific example of such minor alterations of the preferred embodiment we might instead replace the trace edV_1 in the pseudocode above with the following redefinition calculated from edV_0 and d/dw (V_1):

$$edV\_1 := gamma*gamma*lambda*edV\_0 + gamma*d/dw(V\_1)$$

Such a formulation of eV_1 shows more clearly that we can store only a single trace per parameter and might also facilitate memory allocation to the stack by a compiler.

The complete gradient-based mechanism above can be simplified into the following by removing the last few terms of the sum above and arrive at:

e1:=lambda*e1+V0 d/dw(V0)

edV_0:=gamma*lambda*edV_0+d/dw(V_0)

grad_w:=sigma*e1−sigma*(sigma*r_0+gamma*V_1)*edV_0

We may for example also use the related update rule, which is better adapted for the truncated case (rescaled by 1/(2*lambda)):

e1dV_0=gamma*lambda*e1dV_0+d/dw(V_0)

grad_w=sigma*V_0 d/dw(V_0)−(sigma*r+gamma*V_1)*e1dV_0

In the final update in a truncated rollout, we replace V1 with \sigma V_1 in the gradient estimate, i.e. grad_w=sigma*V_0 d/dw (V_0)−(sigma*r+gamma*sigma*V_1)*e1dV_0.

This simplified mechanism often converges in practice, but the convergence behaviour is more complex, as it is no longer a proper gradient on a loss function if the same value estimator is used to generate V_0 and V_1. It differs from the TD lambda algorithm in the first term in the gradient estimate, where the term above has a term that depends only on V_0*d/dw V_0, whereas TD-lambda has a term that depends on V_0*edV_0. Given that edV_0 is a discounted sum of past d/dw V_0-values (including current d/dw V_0), this additionally includes cross terms such as V_0*dV_−1 etc (where dV_−1=d/dw V(t−1) etc). A specific difference in the provided invention is that the term V_0*dV0 is separable from (i.e. not linearly dependent on the whole contribution to the gradient estimate from) the discounted sum of past V_0*dV_−dt (summed over dt) represented by the term used in TD lambda. In other words, the contribution of our term V_0*dV0 is independent from any contribution to the gradient estimate of a whole discounted sum of past V_0*dV_−dt (where dt signifies the variable of the sum). In certain alternatives to the proposed invention, such as the mentioned TD lambda, this discounted sum is calculated using an eligibility trace updated with the gradient (i.e. partial derivative in case of a single parameter). In other words, whereas TD lambda makes a contribution to the gradient that is proportional to value estimate multiplied by the eligibility trace, the contribution of our invention relies on multiplying the value estimate by the gradient estimate, which is only one term in the discounted sum implicitly calculated by the corresponding product of TD-lambda. A distinguishing feature is thus that the contribution to the gradient estimate from this term alone is different from any contribution to the gradient estimate caused by adding the whole discounted sum used by the corresponding term in TD-lambda.

It can be noted that the correction terms will be zero in the gradient of the loss if another independent value estimate is used for the following time step, since this other value estimator is independent of the parameters of the first value estimator. In other words, the removal of these terms means that the full gradient estimate will be equivalent to the simplified gradient estimate in this case.

These pseudocodes are purely indicative and assisting in the design of an embodiment of the invention. Using these as a guideline, various discrete and continuous embodiments can be arrived at, e.g. by taking the limit of step size dt→0, setting V_0=V_1 (i.e. they are equal in the limit of the time step as t+1*dt→t) and replacing step-based discount rate factors in the eligibility trace updates (e.g. gamma and lambda) with a differential equation formulation with a differential decay proportional to the eligibility trace, removing the various step based discounts before the bootstrap V_1, d/dw(V1) etc (these steps disappear if we take a step t+1*dt in the limit dt→0) and so forth. Such transformations as such can be considered well-known.

Sigma in the example pseudocode is the geometric sum based on lambda from 0 to infinity and can be replaced with the integral from 0 to infinity of the corresponding exponential function described by the differential equation used to update the trace in a continuous formulation. We can also update eligibility traces in a continuous formulation while using a finite time step between V_0 and V_1 etc. Suitable step-based discounts gamma and lambda should then preferably match the corresponding integrals between times 0 and the discrete following time step for the exponential formulations of the decay. Using the above and similar transformations of the parameters described in our example pseudocode will provide sufficient guiding to achieve proper learning functionality in any of these specific embodiments. The time step effectively disappears as we take the limit in some continuous formulations as describe above, meaning that V_1 in the pseudocode can be interpreted as a value estimate generated from the same or a following time step compared to the time step used to generate V_0. If a finite time step between V_0 and V_1 is used with a continuous reward function the reward function should be integrated between time t and time t+1 with the reward weighted by the appropriate exponential decay in this time window (i.e. "an integral in a discounted time window"). Similarly, if the reward is given at certain time steps that are smaller than the time steps between the value estimates, a discounted sum in an interval similar to the integral in the discounted time window can instead be used. If a time step is used this can be assumed to be handled by the appropriate discretization process. The reward can be a momentaneous value, an integral in a discounted time window, a discounted sum within a time window, or a value for a certain time step such as those mentioned here, depending on the specific of the problem setting and hardware. In other words, the role of the reward term of the pseudocode is to evaluate the reward received between V_0 and V_1, taking discount into account. We herein refer to the appropriate reward as the reward for short, with any variation such as those above obvious to the skilled person from the description here.

The lambda of the supervised eligibility traces decides the rate at which value estimates transition from a Monte Carlo estimate based on towards a bootstrapping estimate similar to TD-learning. The discount rate of the bootstrapped estimate is decided by the weights in the linear combination of the reward and the discounted value estimate. The weight of the reward is set to 1 and the weight of the discounted value estimate is set to a value in the range (0 1) in this preferred embodiment, which makes the results easily interpretable as a value estimate related to those of Continuous TD-lambda and similar methods. Note that a weight of 0 (zero) would make the system a pure Monte Carlo estimation, which is outside the scope of the invention, while values greater than or equal to 1 tend to be unstable in this preferred embodiment.

Note that for patent limitation purposes, any linear combination, sums and/or signals to be added/subtracted together in this context mean a contribution with a weight different from 0. In other words, for a term to be considered a contribution to a combination for this purpose it needs to have any effect on the output. Lambda and gamma are expected to be different from 0 (at some moment) and will generally not converge if kept in at values greater than 1. Sums etc can be either addition(s) and/or subtraction(s) and/or other equivalent operation(s) for the same purpose. More generally, adding a signal to another signal includes any suitable means of combining the signals.

In general, the additions of other signals spanning the space spanned by the signals in a sum can also be considered a sum of the original sum. As can any sum of variables each constituting a sum of subsets of the signals, etc.

These and other signals can also be encoded within other signals, such as by application of non-linear lossy rescaling for efficient transmission, e.g. using alternative floating point representations, and/or application of various encryption methods for secure transfer between computational nodes in a distributed processor. In general the invention is resistant to noise, meaning that signals with noise and/or relying on any approximation(s) may be used. In particular, small differences in the corresponding timings of various signals may be acceptable approximations if these differences are negligible in the context of the learning problem.

Signals and/or values obtained, and/or those used internally in the system, can likewise be represented in a variety of formats including those indicated above. In particular, pairs of terms sharing a common factor, one of them being the pair sigma*r*edV_0 and gamma*V_1*edV_0, can be generated together. For example the mentioned pair can be generated as (sigma*r+gamma*V_1)*edV_0 with the resulting signal directed to the gradient estimate (after additional multiplication by sigma) being a sum of these two signals. Another option in these two cases is to send the signals representing reward and V2 estimate summed together as a single signal in case of the simplified version of the invention.

The given preferred embodiments can also be generalized to subsampling in time, updates merging several time steps into a single update and/or treating several time steps as a single multistep update. This can be advantageous for adaptation to the processor and such optimizations may also take place automatically by compilers. Alternatively, we change the order of the computations in this preferred embodiment by generating and feeding the terms individually into the gradient estimator. Such linear transformations and/or other simple changes of this or any other step in the generation can be considered trivial to the skilled person. Such trivial changes in the evaluation order may also be automatically implemented by compiler optimization and/or software for designing hardware. For example, memory addresses can be changed, values can be sent implicitly and/or in compressed and/or sparse format etc. An exhaustive list of precise possible variations could be prohibitive in terms of the required descriptive length, but will in any case be understood by the skilled person to be easily realized from and described by the conceptual descriptions of the system used herein.

The lambda value in the bootstrapped reward estimate can be seen as a discount rate for the bootstrap, i.e. similar to the discount factor in TD-based value estimation. This decides the rate at which future rewards are discounted against current rewards when performing bootstrapping. The discount rate for the bootstrap not necessarily constant in this preferred embodiment. In fact, it might be better to initially rely on Monte Carlo estimates until the bootstrap achieves lower variance than the Monte Carlo samples. In the later stages of training it can again be beneficial to switch to Monte Carlo sampling in order to do fine tuning with less reliance on bootstrapping. In another example the discount can be adapted for optimal learning, such as in the Adaptive Lambda Least-Squares Temporal Difference Learning algorithm. Likewise, the discount rate for the reward may be adapted similarly toe the discount rate of the bootstrap, i.e. lambda and gamma may both change over the training process.

There are many possible variations on the particulars of the bootstrap. For example, it can be combined with methods for choosing the degree of bootstrapping based on the observation and/or the value estimate itself. Examples of these variations is to rely on TD learning to a higher degree in certain areas of the state space where its assumptions are known to be more appropriate, or the strategy to avoid Monte Carlo estimates in areas with negative rewards due to the cost of exploration in these.

The bootstrapped reward estimate in combination with eligibility traces and a policy gradient actor-critic setup allows a natural transition between what can be approximately seen as three different problem formulations: POMDP; Monte Carlo estimation of an MDP; and TD learning.

The value estimate used to bootstrap the gradient estimate, which we herein call V2, can be either from the value estimator or from another source of value estimations. In particular, it may optionally be obtained from another differentiable value estimator. As an example of this, a common variation on this theme is to have a pair or set of value estimators that exchange value estimation in their gradient updates. Such pairs of value estimators are often used in contemporary TD-learning methods in order to avoid a systematic overestimation of the value of an observation or state under certain conditions. In such an example, the embodiment of the invention would implement an analogue strategy by using a set of value estimators. They would use their own value estimator to generate the value estimate, but calculate the gradient estimate partially using bootstrapping from another value estimate V2 received from a separate value estimator. For example, in the provided example pseudocode V_0 would be updated from the value estimator V, while V_1 could be generated from another estimator V2. The estimate in our pseudocode would then more properly be named V2_1, again using our notation with subscript as a short for V2(t+1)=V2(o(t+1), w). In our original example pseudo code we have used the fact that V is the same as V2, i.e. the value estimate is being bootstrapped using the same value estimator as that used to generate the value estimate in this example.

Using only the terms of the simplified embodiment of the system is an option for simplicity when bootstrapping with another value estimator. It is, however, possible to send the correction terms depending on V2 to the gradient estimate of V2 (which in turn might be a composite function of several value estimators, which means it will propagate the gradient estimate to two or more such value estimator subsystems). This approach of exchanging correction terms may imply a strategy where we optimize two or more estimators simultaneously on a global loss function comprising several loss functions on several estimators. The gradient estimate V might then also receive several additional correction terms from the bootstrapped gradient estimates of other estimators. As an example, the gradient estimate of V can receive the correction terms from the gradient estimate of V2 that is bootstrapping with V. In the simplest such setup we have two estimators V and V2 which send each other their respective correction terms. Note that the correction terms in V depend on a gradient estimate for V2, which must also be obtained by V from V2 if these correction terms are to be generated (and vice versa).

Note that V2 even when different from V might contain the value estimator as a subsystem and/or use it as an input, which means that some parameters of V2 correspond to parameters in the value estimator. A simple example of this is if we as V2 use a linear combination of the value estimate and one or more other value estimators. Handling such cases is straightforward if V2 is differentiable, e.g. by using automatic differentiation where the gradients will be propagated automatically from V2 to the value estimator and added as terms to the gradient estimate of the value estimator's corresponding parameters.

For example, V2 may use a different parameterization and/or set of received observation(s) from the value estimate (V1). The received value estimate V2 should in the preferred embodiment be, either exactly or approximately, some value estimate for the same agent as the agent whose value is being estimated by the value estimate (V1) and for the same state as the state generating the observation for the value estimate (V1) at the same moment or at some following moment. However, some embodiments covered herein, such certain embodiments using a decaying amount of bootstrapping throughout the training process, may reliably achieve convergence with practically any V2. Bootstrapping with pure noise will generally not accelerate the learning process (and may slow it down) and should be avoided whenever possible. However, when V2 is received from an outside source verifying this is not always possible beforehand. An approximation used as V2 can sometimes be very rough and still be useful in accelerating the learning process to some degree.

When describing terms being proportional to some product of values and these terms being added at several moments in time, this does not necessarily imply that the proportions of these products are unchanged between moments. For example, the example pseudocodes above include other factors in such terms that change over time.

A skilled person realizes that there are many other possible embodiments, including estimates that add noise, regularization and/or gradient substitutes such as: natural gradients and/or conjugate gradients. The conditions for a gradient estimate to be useful in a gradient descent strategy can be considered well-known. In short, the projection of the gradient estimate onto the true gradient needs to lie in the direction of the gradient estimate to guarantee a reduction of the loss under usual gradient descent strategies. Scaling the gradient estimate by any scalar will not substantially affect its usability in an optimizer and can be done at will. The gradient estimate can be transmitted in various forms, e.g. a set of vector signals or a set of scalars. Alternatively, the gradient estimate can be transmitted to the optimizer(s) in various formats such as a number of separate terms in order to be combined at the destination through linear combination or similar.

The value estimator can be stochastic and it may also be beneficial to artificially introduce noise in its estimation during training, as this acts as a regularization. Such mechanisms are common in the field of machine learning, where examples of common noise types are Gaussian and Dropout.

The eligibility trace can be distributed and constitute several values or traces updated in an equivalent way. For example, each term in a sum of terms each comprising an eligibility trace can be calculated by its own subsystem with its own eligibility trace. These subsystems then collectively constitute the eligibility trace.

This is also true if the subcomponents are out of time synchronization, i.e. their values are different due to time differences and/or due to each subsystem sampling from a different trajectory of the same Markov process. If two or more eligibility traces with such time differences (i.e. different time differences from the time differences as implied in the example pseudocode and description above) between them are used within a single term, then some appropriate additional mechanism will be needed to compensate for the time differences. In many cases we can explicitly store states for a few time steps in order add additional terms that compensate for time differences within some small time window. In other cases, we can simply rely on the fact that the order of terms being summed to a gradient estimate and/or parameter update will not affect the result of the summation. Also, some small delays in updating the parameters, causing gradient estimates to be updated using old parameter values for the value estimator, might not significantly alter the functioning of the optimizer as the parameters can be expected to change slowly (depending on specifics and hyperparameters of the optimizer).

Eligibility traces in general and our invention in particular are especially suited for adaptation in contemporary general-purpose computers due to their efficient memory use. Although standard techniques such as backpropagation through time can provide equivalent mathematical results to the invention, the need to maintain a storage of past states, observation and/or actions means that memory requirements for typical contemporary general purpose computers become inviable for a large group of practical problems on such systems. Especially reinforcement learning systems relying on pixel-based visual inputs are known to lead to memory problems on typical hardware. The use of traces solves this by reducing the amount of information that need to be stored by encoding only the relevant parts of the information in one or more signals called traces. A reduced memory usage also allows a higher proportion of the computation to be performed using the limited faster memories, such as a CPU cache or GPU memory. The invention may also provide other computational advantages.

Similar advantages of the proposed system are valid for electronic circuit and similar hardware embodiments of the processor(s) and memory of the invention. In addition, in such embodiments the simplicity of the architecture allows a higher density of processing units by removing the circuits for centralized memory access, backpropagation information pipelines etc. An eligibility trace can be stored in physical proximity to the parameter itself and exponential decay is a mechanism that is usually extremely simple to implement through electronics, e.g. through capacitors, feedback loops with delay and/or timed binary division. Such simpler hardware architectures can be designed both cheaper and faster than traditional reinforcement learning hardware architectures. We also note that the computations involved can be made to rely only on local information and that computation and memory requirements scale approximately linearly with parameter sizes in the preferred embodiment.

Compared to Monte Carlo estimation, traces with bootstrapping offer substantially faster convergence for a large class of problems where we can rely on the full or extensive observability of the problem. Expressed differently, our bootstrapping allows us to approximate the problem as a fully observable Markov decision process. The gradual transition from Monte Carlo method to bootstrapping also allows us to combine the weaker assumptions on observability in short-term patterns with the stronger assumptions while looking for long-term patterns. This hybrid approach between assumption types is especially sound when a learning system is presented with feedback delays and/or gradual accumulation of information about past states common in practical systems that limit the validity of full observability assumptions, while the learning mechanisms for long-term state transitions can rely on the stronger assumptions to bootstrap the information and boost convergence rates over these long-term patterns where the number of independent samples is likely to be sparser and hence learning efficiency more important. In general, reinforcement learning involves very expensive training processes and any increase in convergence speed is critical to such systems. At the same time, they frequently suffer from convergence issues if inappropriate simplifying approximations are used. The dynamic transition of the approximations used by the invention opens new possibilities for combining the convergence advantages of both Monte Carlo and bootstrapping methods.

Optionally, the invention includes an optimizer. Given a gradient estimate, an optimizer is a technical system that tries to improve on the parameters in an iterative manner. There are many possible optimizers, including but not limited to computer implementations of the following: gradient descent; natural gradient descent; descent methods utilizing estimates of the second-order derivatives; descent including linear search; conjugate gradient descent; momentum-based strategies; and methods discarding the magnitude of the gradient estimate. Variations on these and other optimizers are obvious to the skilled person. The preferred embodiment of the invention uses a regular gradient descent strategy with a decaying step sizes in the direction of the gradient for reasons of simplicity and stability. Expressed differently, the parameters are a program code automatically generated by the optimizer and stored to the memory. This program code, together with information about the encoding of the parameter space, can be interpreted, compiled or turned into hardware equivalents by tools or systems such as a neural network framework. The generated program is optimized for accurately predicting how well a given system achieves the purpose defined by the reward system.

It should be understood that there is no need to store to parameter updates to memory to have a desired technical effect. We would like to bring to attention that, in light of very recent privacy developments within the EU, federated learning has been widely adopted in the industry as a way to provide data anonymity while training networks across multiple actors (e.g. Owkin, Googe Gboard, Tesla etc). Federated learning also provides network load advantages compared to transfer of data and is being implemented also for these reasons. The distributed nature of the federated training system means that it is spread across several juridical persons, usually with one central juridical person performing the actual updating of the parameters and several juridical persons supplying the gradient estimates. Here the gradient estimates for use in value estimators are effectively an industrial commodity traded, sold or otherwise negotiated on between the companies and/or individuals and the gradient estimates therefore constitutes an intended, valuable and tradeable technical result in itself.

The parameters may at the same time be a representation for several possible embodiments. For example, while we are optimizing a computer-implemented actor we may at the same time be optimizing an equivalent hardware design and/or configuration of another technical value estimation system based on these parameters. Both the parameter set and a such designed and/or configured hardware can then be considered outputs of the corresponding method.

The gradient estimate and the optimizer can also be combined in the invention in such a way that they are difficult to clearly separate into different steps or subsystems. An example of such case is estimates of higher order derivatives based on a series of first-order derivatives.

It is also possible to split the gradient estimate sent to the optimizer over several signals or to spread it over time. Example of such variations is to generate another eligibility trace that slowly sends its contribution to the gradient across multiple time steps, for example as the pseudocode example does by adding values to the trace e1. It is also possible to send the terms one-by-one to optimizer and to update the value estimator parameter until the parameters have been updated using all the terms. Also in this case the optimizer generates an updated set of parameters based on a gradient estimate comprising the mentioned terms sent in a distributed manner across time and/or multiple signals.

It is also possible to distribute the functionality across a plurality of subsystems. A particular example is collecting gradient estimates from several separate actors, such as several identical robotic systems, and merging them into a more accurate gradient estimate. Another example is merging several weight updates from several optimizers into a global weight update. Variations on such distribution are common in reinforcement learning and obvious to the skilled person.

In an optional embodiment, the invention includes an actor optimizer. An actor optimizer is technical system with the purpose to adjust one or more of the actor parameter(s) in order to produce a policy that achieves a better expected reward over time. Although a policy can be improved through a policy gradient approach using the reward and exploratory noise alone, it is often beneficial for the learning process to instead improve the policy with help from the value estimate. The actor optimizer then receives an input comprising the reward signal and the value estimate and creates an intrinsic reward which is passed to the actor optimizer. Finally, the actor optimizer generates a new set of one or more parameter(s) that improve the policy. Certain value-estimation frameworks, such as Q-learning, generates an optimal or approximately optimal partial policy for each time step while other frameworks, such as policy gradient methods, improve persistent policies gradually over time. Systems using persistent policies can disconnect the actor from the actor optimizer once the optimization phase is complete and then apply the optimized actor independently for generating actions.

Note that the actor parameter(s), like those of the value estimator, may simultaneously represent the policy of several actor systems. In other words, both the actor generating actions in the optimization system and other equivalent systems, for example a hardware implementation of said actor and/or a computer implementing the actor in a slightly different way, may be considered optimized by and outputs of the provided method.

The reliance on stronger assumptions about the problem type that are implicit in the use of intrinsic rewards and/or bootstrapping often allows for faster convergence, but might not perfectly align with best local solution due to the assumptions being at least partly invalid. In these cases, their usage can be gradually decreased as training progresses in order to gain both the benefit of faster learning and convergence to the true local optimum. The decrease of bootstrapping can be implemented in an embodiment by having a rate of bootstrapping in the value estimate gradient that decreases over time rather than staying constant. The usage of intrinsic reward by the actor optimizer can also be decreased over time and instead be gradually replaced by the actual reward, possibly with the reward discount being handled directly by methods such as eligibility traces in a policy gradient actor. Another method is by making the decay of the eligibility trace used in a policy gradient actor optimizer increase until it agrees with or having it converge toward the rate used by the value approximation. If the rates agree the intrinsic reward no longer biases the optimum of the actor optimizer. The critic can still function as an observation-dependent baseline for a policy gradient actor, which reduces the variance of its policy gradient estimates. It is also possible to connect multiple critics with different decay rates to the same actor, or to bootstrap the critic with a critic that is using a different eligibility trace.

One aspect of the system includes a technical subsystem controlled by the actor. A possible subsystem is a planning system, which is a system that optimizes and directly or indirectly controls the behaviour of an organization, factory, production plant, heating or cooling system, manufacturing line, pipeline, transmission lines, computer cluster, extraction unit or similar. A typical such system is an industrial production planning system, where one or more policies are used for continuous control or for planning a series of actions in order to optimize a reward created from a combination of objectives such as: production; resource use; production times; and quality. Observation used are collected from a variety of sensors and a production plan is generated, which might be followed by human controllers and/or automatic control. Other examples of planning systems include: marketing planning systems and logistical planning systems.

Technical planning systems are computer programs that have become common and critical to the profitability and/or efficient operation in many industrial and governmental sectors, including: hydro power production; thermal power production; geothermal heat exchange; heating systems; cooling systems; transmission lines; manufacturing production lines; a specific machine in a production line; water pumping systems; service content provision systems; computer load balancing; automated marketing systems; water sanitation systems; oil and general resource extraction; pipeline control; and mining operations. These systems control technical systems or a mixture of technical and other (such as human) operation. The planning system can control the operations directly or, perhaps more commonly, indirectly by suggesting technical action plans for human decision makers and/or operators. Commonly existing optimization software commonly rely on conventional optimization techniques that scale poorly with problem size and/or do not take generalization and overfitting into consideration.

The reinforcement learning approach has entered research stages in several sectors as a promising alternative for technical planning applications. Providing frequently and timely plans is a major challenge, as well as the computational and memory challenges fueled by the recent decreases in sensor costs and structured data collection efforts by relevant organizations. Information security needs that prevent widespread cloud computation and storage further aggravate the issue of memory and computational efficiency in executing planning systems. Another factor giving rise to computational complexity is the desire to move to more accurate non-linear models, whereas the existing system often rely in linearizations and other simplifications in order to be computationally feasible.

Technical planning systems often use a simulator, model and/or digital twin for the optimization process, which is assumed to have sufficient correspondence with the real system. Commonly a specific simulation tool is used to produce this simulator and historical data is applied to verify or improve it. The desired action can be a plan for each moment or a plan for some time period. Actions at each moment are generally a more correctly formulated optimization problems, since action plans are purely hypothetical and tend to be modified as more information arrives to the planning system, while the optimal actions at each moment lead to real actions taken and corresponding changes in the environment. Generated immediate actions do not constitute an action plan per se, but still perform operations planning given the context of their generation for the purpose of optimizing the long-term overall outcome given some explicit or implicit estimation of the deterministic or stochastic estimation of the results of immediately taken actions. Industrial control system can thus be considered planning system if the immediate control is optimized towards achieving long-term objectives in a non-obvious fashion, i.e. when the linking of the immediate results to long-term advantage is non-trivial.

The planning usually take place within some constraints. Traditional optimization methods such as simplex method or dynamic programming usually embed such constraints into the optimization methods, while reinforcement learning preferable handles them with an appropriate negative reward. Since these systems tend to contain some level of stochasticity this latter approach encourages the control system to maintain some margin from the constraint boundaries.

For example, the technical planning system may, after optimization, control the corresponding industrial process by communicating its control signals directly with SCADA-systems or may alternatively be interfacing directly with the machines and/or user interfaces. Generally, the many types of universal function approximators that may be used in such technical planning system can also be compiled into efficient code for deployment in edge computing solutions, for example using the corresponding infrastructure around state-of-the-art AI frameworks such as TensorFlow and/or Flux. For security reasons the actors can be trained and/or deployed on a local network with access to sensors, but with no or limited access to the internet. Sometimes external information can be allowed through firewalls, such as updated resource costs for the various resources used in the process.

The efficiency of industrial processes according to various aspects of commercial interest, for example: human labour intensity, resource usage, production, reuse of material and required energy input, is essential to the profitability of an industrial process in a competitive segment. A small difference in such parameters can have a large impact of the profitability of a process in a competitive environment and constant adjustment of the operation can be assumed to be necessary in a non-static society. Using the training method above as a part of these industrial processes, preferably by training in a continuous manner to adapt to changes in the parameters of relevance to the process, will generally lead to a more effective production from these and other aspects and be able to produce the desired outputs from these processes for a lesser cost per unit of production than alternative methods with lower computational ability and the consequently less flexible processes. Likewise, the environment impact and resource use can be reduced.

Another possible subsystem is motor control of a robotic system. Observation are received from sensors and used to create an optimal motion, usually regarding rewards based on factors such as: time; precision; force; distance covered; specific achieved objectives; damage avoidance; and energy use. The robot can be a static type, usually for industrial purposes, or a self-moving robot.

Commonly in robotic systems the state of the robots is assumed to be known and movement planning is done analytically through inverse dynamics. Excellent accuracy can be achieved through careful calibration of the parameters of the dynamics in the unconstrained case, but when interacting with external objects the validity of the assumptions fails to represent the problem at hand. Many promising types of actuators, such as pneumatic actuators, also display a non-linear behaviour that is difficult to handle computationally using inverse dynamics methods. Reinforcement learning with its general problem formulation is not dependent on a traditional dynamics model and is well adapted to handling such scenarios and others.

Controlling robots through policies trained through reinforcement learning is a challenging task. The objects and environments that the robot needs to interact with are often very complex. Movements and reaction times are expected to be rapid in order to maintain balance and appropriately react to variations in external forces, friction and other active objects. At the same time rewards are often based on achieved objectives and sparse in relation to the reaction times needed. As a consequence, the credit assignment problem is rather difficult and the error signal needs to be backpropagated through a large number of time steps with TD-based or backpropagation methods. The memory or computational requirements grow with the number of timesteps, which makes the approaches difficult. In addition, the feedback delays from sensor systems might be noticeable in comparison to the time scales used. This fact, combined with the large number of uncertainties and the difficulty in exactly modelling the complex environment, makes the full observability assumption used in TD-based learning impractical. The invention drastically reduces the memory requirements in such cases, and allows a transition from short-term POMDP assumptions using policy gradient training of the actor to the larger-scale biased control variates provided by Monte Carlo value estimation and finally to the MDP-like assumptions of the bootstrapping.

Another possible subsystem is vehicles designed to be controlled by any combination of humans; conventional autonomous system and/or self-learning agents. Vehicles can be any machine carrying cargo, passenger, payload and/or equipment and includes: motor vehicles, propelled vehicles, aircraft, railed vehicles, watercraft, rockets, spacecraft, missiles and guided projectiles. The control of the actor can be either: the complete control of movement control as well as all other functions of the vehicle; or be limited to controlling one or more subsystems. The observation may include variables such as sensor inputs from LIDAR, radar, cameras, speed sensors, pitot pipes, engine temperatures. Actions can be parameters such as steering angles, desired movement coordinates, velocity, cabin temperature and instrument lights. The problems here are similar to those in robotics and the distinction between the fields and methods used in each can be seen as partly historical.

Robots, vehicles and planning systems usually involve a considerable capital and time expense for sampling relevant data and/or in case of undesired behaviour by the system. It is often preferable to train the relevant reinforcement learning system in one or more simulator(s). After the simulator training process the system can be applied the real environment with or without fine-tuning of value estimate and/or agent parameters in the real environment. Ideally the training process can take place in a series of simulator(s) with increasing computation complexity and similarity with the real application. It is possible to also use offline data for training the value estimator. Optionally, fine tuning of both the value estimator and actor may later be done in the real system.

Vehicles and robots preferably deploy the actor without online training on every unit when entering manufacturing. This is due to inefficiency of training on data received from a single unit versus the risk from bias. Instead, data may preferably be collected from all units and merged into a single efficient actor system and/or value estimator. Also, the limited computing power on solutions disconnected from the power grid may bring significant disadvantages to performing a learning process online. For a vehicle it might also be preferable to train the actor to not rely on a single sensor by introducing noise. In contrast, in an industrial planning system it may be more feasible to replace sensor data with simulated data due to the redundancy of sensors and availability of computing resources in such a setting.

Intelligent control systems is an increasing part of the technical development cost of new vehicles. Aspects of the proposed method provides an efficient way to design and/or manufacture such intelligent vehicles with expected benefits in control 1955 complexity and/or cost of manufacture per unit compared to comparable methods. Training neural networks for self-driving ground vehicles in particular is a central part in the life cycle production process of cars and in general the creation intelligent control is essential in reaching the expected functionality of modern vehicle construction. In many of these cases the vehicle design inherently support the deployment of actors in general purpose computers inside the vehicles that have direct access to sensors. Likewise, the construction of complex control of rockets have allowed reusability of components that allow launches at a fraction of the cost. All these and other vehicles can achieve benefits, for example reducing production costs over the production lifecycle, enhanced control (in the resulting vehicles), increased safety, higher degrees of automation and/or reduced fuel consumption.

The value function estimator can be trained on historical data as an approximation for the actual policy and/or actual environment. If the historical policy and/or environment can be assumed to be close the final policy this can be a good approximation. Training can also take place in real and/or simulated environments fundamentally different from but in some aspects similar to the target application. This is known as transfer learning and is relatively common in the field.

Alternatively, it is possible to regard the planning system, robot or vehicle as an overall technical system that includes a reinforcement machine learning system as a sub-system thereof.

The planning system, robot or vehicle may also be seen as controlled by the reinforcement machine learning system, with the reinforcement machine learning system as an integral sub-system thereof or as a separate but interconnected entity.

It will be appreciated that the methods and devices described above can be combined and re-arranged in a variety of ways, and that the methods can be performed by one or more suitably programmed or configured digital signal processors and other known electronic circuits (e.g. discrete logic gates interconnected to perform a specialized function, or application-specific integrated circuits).

Many aspects of this invention are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device in which the invention is implemented. It may also be possible to re-use existing software, e.g. by reprogramming of the existing software or by adding new software components.

It can be noted that the term 'state' sometimes also refer to the observation and sometimes refer to the value estimation. The mixing together of these terms is common in the literature of the field, as much early work in Q-learning, TD-learning and related approaches assumed a fully observable state.

It is also possible to provide a solution based on a combination of hardware and software. The actual hardware-software partitioning can be decided by a system designer based on a number of factors including processing speed, cost of implementation and other requirements.

Figure 7:
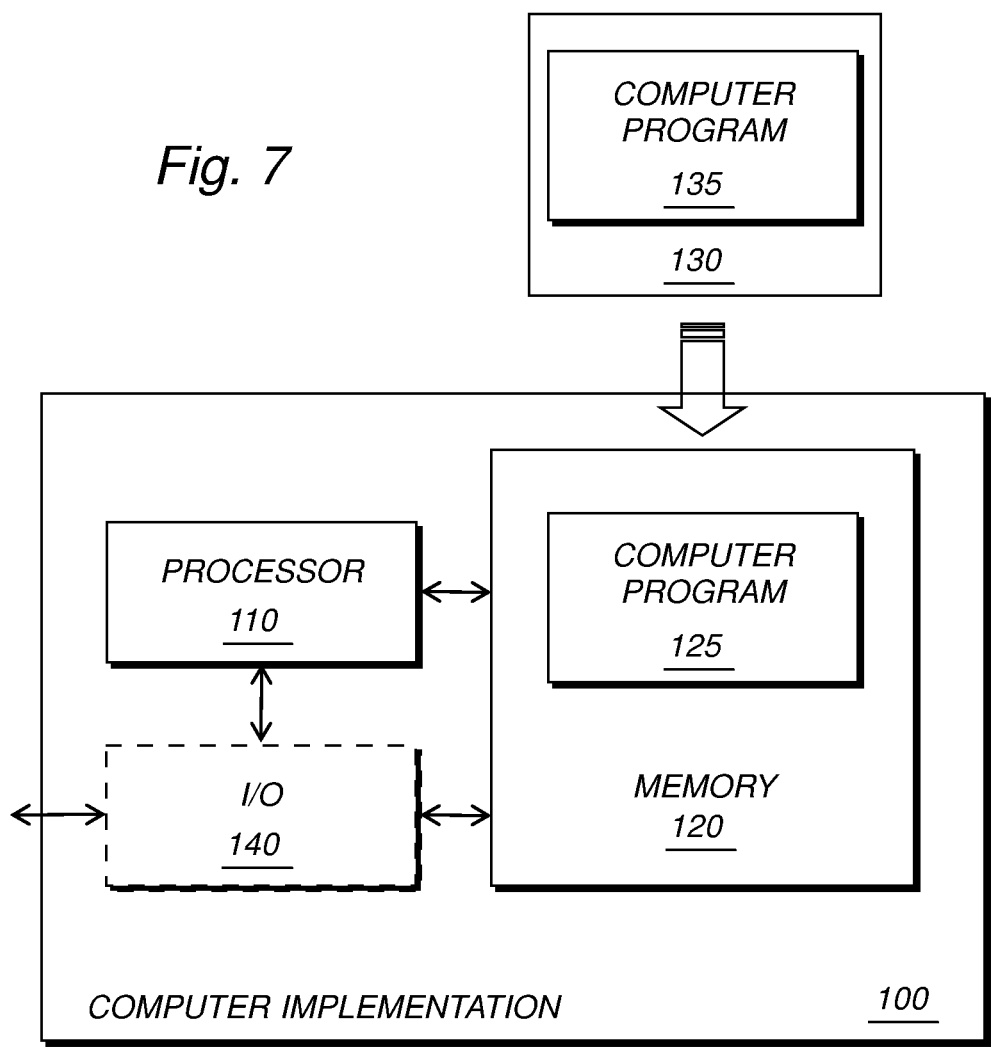
FIG. 7 is a schematic diagram illustrating an example of a computer-implementation according to an embodiment.

FIG. 7 is a schematic diagram illustrating an example of a computer-implementation 100 according to an embodiment. In this particular example, at least some of the steps, functions, procedures, modules and/or blocks described herein are implemented in a computer program 125; 135, which is loaded into the memory 120 for execution by processing circuitry including one or more processors 110. The processor(s) 110 and memory 120 are interconnected to each other to enable normal software execution. An optional input/output device 140 may also be interconnected to the processor(s) 110 and/or the memory 120 to enable input and/or output of relevant data such as input parameter(s) and/or resulting output parameter(s).

The term 'processor' should be interpreted in a general sense as:
  any system or device capable of executing program code or computer program instructions to perform a particular processing, determining or computing task; and/or
  a dedicated hardware circuitry specifically designed to manipulate signals in a specific manner; and/or
  a parameterized hardware circuitry specifically designed to manipulate signals in a specific manner partly described by some parameters or instructions with an expressive power that fall short of constituting a general purpose programming language.

The processing circuitry including one or more processors 110 is thus configured to perform, when executing the computer program 125, well-defined processing tasks such as those described herein.

The processing circuitry does not have to be dedicated to only execute the above-described steps, functions, procedure and/or blocks, but may also execute other tasks.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

According to an aspect, there is thus provided a computer program comprising instructions, which when executed by at least one processor, cause the at least one processor to perform any of the method or methods disclosed herein.

The software may be realized as a computer program product, which is normally carried on a non-transitory computer-readable medium, for example a CD, DVD, USB memory, hard drive or any other conventional memory device. The software may thus be loaded into the operating memory of a computer or equivalent processing system for execution by a processor. The computer/processor does not have to be dedicated to only execute the above-described steps, functions, procedure and/or blocks, but may also execute other software tasks.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Alternatively, it is possible to realize the module(s) predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A system for supporting machine learning by generating a gradient estimate for a technical optimizer configured to generate parameters in a machine learning system, said system comprising:
   one or more processors;
   a memory configured to store one or more parameters of an estimator;
   a differentiable estimator of discounted reward, the differentiable estimator also being referred to as a value estimator, configured to, by the one or more processors: receive an observation including information representative of one or more observations of an environment and/or system at a moment in time, access parameters of the value estimator from the memory and generate a discounted reward estimate, also referred to as a value estimate, in a value estimation process;
   one or more eligibility trace generators configured to, continuously and/or through several steps and/or moments of the eligibility trace generator and by the one or more processors: receive from the value estimator a partial derivative of the value estimate with respect to one of the parameters of the value estimation process; receive a signal from the eligibility trace generator and generate an updated signal, also referred to as an eligibility trace, such that each step and/or moment comprises operations such that:
   the signal is decaying in real or simulated time at a rate proportional to the respective signal, i.e. exponential decay in time corresponding to the observation;
   to the signal is added a value proportional to the partial derivative of the value estimate;
   thereby maintaining or keeping a signal, between steps and/or moments of the eligibility trace generator, by values being added and/or subtracted at various moments to the eligibility trace while the resulting sum undergoes an exponential decay in time, whereby said eligibility trace(s) functions as a selective memory allowing the gradient estimate to be generated based on a single or only a subset of the observations and/or states together with information from the eligibility trace(s) without the need to iterate over each observation, thereby reducing memory and/or computational requirements; and
   one or more bootstrapped gradient estimators configured to, by the one or more processors: receive a reward signal from a technical reward system; receive the value estimate; receive the eligibility trace; and create the gradient estimate based on an input comprising: the reward; the eligibility trace(s); the value estimate; and the partial derivative of the value estimate, and to direct said gradient estimate to said optimizer.

2. The system of claim 1, wherein the one or more bootstrapped gradient estimators generates the gradient estimate in a process comprising adding and/or subtracting each of:
   a signal proportional to the value estimate multiplied by the partial derivative(s) of the value estimate and with that product being separable from the value estimate multiplied with the eligibility trace(s);
   a signal proportional to the eligibility trace(s) multiplied by the reward; and
   a signal proportional to the eligibility trace(s) multiplied with the value estimate and/or another value estimate, with the value estimate(s) in this signal being for the same or a following moment.

3. The system of claim 2, wherein the value estimator is non-linear.

4. The system of claim 3, further comprising one or more optimizers configured to, by the one or more processors: receive the gradient estimate, receive one or more parameters controlling the functioning of any value estimator; and generate updated parameters; and store the new parameter(s) in the memory,
   wherein two or more parameters controlling the functioning of a value estimate are updated:
   without estimating a value for each combination of individual parameter, i.e.
   without computing any matrices with all combinations of parameters and hence allowing a memory and/or computational complexity less than quadratic in the number of parameters; and
   without simultaneously storing in memory each observation and/or state used to calculate by the eligibility trace(s) the discounted sum of past derivatives of the value estimate.

5. The system of claim 1, wherein the one or more bootstrapped gradient estimators are configured to, by the one or more processors, create the gradient estimate based on an input further comprising a value proportional to a linear combination of: the discounted sum of the past reward and optionally any value estimate.

6. The system of claim 5, wherein the one or more bootstrapped gradient estimator generates the gradient estimate in a process comprising adding and/or subtracting each of:
   a signal proportional to the value estimate multiplied by the partial derivative(s) of the value estimate;
   a signal proportional to the eligibility trace(s) multiplied by the reward; and
   a signal proportional to the eligibility trace(s) multiplied with variable V2, V2 being the same value estimate or another value estimate, for the same or a future moment;
   and wherein the gradient estimator further generates a correction signal directed to any gradient estimate and/or optimizer of V2 comprising each of the following terms separately and/or combined/summed together in any combination(s):
   a signal proportional to the discounted sum of the past value estimate multiplied with partial derivative(s) of V2 at the same or a future moment;
   a signal proportional to any eligibility trace(s) multiplied by a discounted sum of V2, and
   a signal proportional to any eligibility trace(s) multiplied by a discounted sum of the past reward.

7. The system of claim 5, wherein the one or more bootstrapped gradient estimator generates the gradient estimate in a process comprising adding and/or subtracting each of:
   a signal proportional to the value estimate multiplied by the partial derivative(s) of the value estimate;
   a signal proportional to the eligibility trace(s) multiplied by the reward; and
   a signal proportional to the eligibility trace(s) multiplied with variable V2, V2 being the same value estimate or another value estimate, for the same or a future moment;
   and wherein the gradient estimator further generates a correction signal directed to any gradient estimate and/or optimizer of V2 comprising each of the following terms separately and/or combined/summed together in any combination(s):

a signal proportional to the discounted sum of the past value estimate multiplied with partial derivative(s) of V2 at the same or a future moment;

a signal proportional to the partial derivative(s) of V2 multiplied by a discounted sum of the past reward;

a signal proportional to the reward multiplied by the partial derivative(s) of V2, a signal proportional to the partial derivative(s) of V2 multiplied by V2, and a signal proportional to any eligibility trace(s) multiplied by the partial derivative(s) of V2.

8. A self-learning control system for a controllable technical system, wherein the self-learning control system comprises a system for supporting machine learning according to claim 1.

9. A computer-implemented and/or apparatus-implemented method for supporting machine learning by generating a gradient estimate for a technical optimizer configured to generate parameters in a machine learning system, said method comprising the steps of obtaining (S4): a value based on an eligibility trace and/or another estimate of a discounted sum of past partial derivative(s) of a value estimator, for each of one or more of the value estimator parameters; and a reward as part of technical feedback from a technical system and/or environment; and optionally any additional value estimate;

generating (S5) a value estimator gradient estimate, for use in an apparatus or computer-implemented program for performing gradient-based parameter optimization of some value estimator, referred to as an optimizer, based on each of the following signals:

a value proportional to: the value estimate multiplied by the partial derivative(s) of the value estimate with respect to the parameter(s) such that this value is also separable from any contribution to the gradient estimate that is proportional to the value estimate multiplied by the discounted sum of the past partial derivative(s) of the value estimate;

a value proportional to: the reward multiplied by the eligibility trace(s) and/or a value proportional to the other estimate of the discounted sum of the past partial derivative(s) of the value estimate;

a value proportional to: the eligibility trace(s) and/or a value proportional to the other estimate of discounted sum of the past partial derivative(s) of the value estimate multiplied by variable V2, V2 being any value estimate, for the same or a following moment or time step;

whereby said eligibility trace(s) functions as a selective memory allowing the gradient estimate to be generated based on a single or only a subset of the observations and/or states together with information from the eligibility traces without the need to iterate over each observation, thereby reducing memory and/or computational requirements; and directing (S6) said gradient estimate to said optimizer.

10. The method of claim 9, wherein:

the value obtained in step S4 is an eligibility trace and/or another estimate of a discounted sum of past partial derivative(s) of the value estimate, for each of one or more of the estimator parameters; and a reward as part of technical feedback from the technical system and/or environment; and optionally any additional value estimate;

the gradient estimate comprises each of the following signals, separately and/or combined/summed together in any combination(s):

a value proportional to: the value estimate multiplied by the partial derivative(s) of the value estimate with respect to the parameters such that this value is also separable from any contribution to the gradient estimate that is proportional to the value estimate multiplied by the discounted sum of past partial derivative(s) of the value estimate;

a value proportional to: the reward multiplied by the eligibility trace(s) and/or a value proportional to the other estimate of the discounted sum of past partial derivative(s) of the value estimate;

a value proportional to: the eligibility trace(s) and/or a value proportional to the other estimate of discounted sum of past partial derivative(s) of the value estimate multiplied by variable V2.

11. The method of claim 9, further comprising the steps of:

obtaining (S1): an observation from a technical system and/or environment; and one or more estimator parameters;

generating (S2) a discounted reward estimate, referred to as a value estimate, by a technical differentiable estimator, referred to as a value estimator, based on the observation and the one or more estimator parameters;

generating (S3) the estimate of the partial derivative(s) of the value estimate with respect to one or more estimator parameters of the value estimator, i.e. a gradient of the value estimator.

12. The method of claim 9, further comprising:

extending the gradient estimate with, or directing toward any gradient estimate and/or optimizer for the gradient estimator for V2, the following signals separately and/or combined/summed together in any combination(s):

a value proportional to: the discounted sum of the past value estimate multiplied by partial derivative(s) of V2 for the same or a following moment; and a value proportional to: the product of the discounted sum of past partial derivative(s) of V2 multiplied by V2, both terms being for the same moment or a following moment; and a value proportional to: the product of the discounted sum of the past partial derivative(s) of V2, V2 being for the same or a following moment, and the reward.

13. The method of claim 9, wherein the output of the value estimator is a non-linear function of its inputs.

14. The method of claim 9, wherein the eligibility trace(s) obtained (S4) is decaying at a rate in real or simulated time proportional to the eligibility trace(s) and is increased based on the partial derivative(s) of the value estimate at one or more moments; and the method further comprises the steps of:

obtaining: the estimate of the partial derivative(s) of the value estimate with respect to the value estimator parameters; and updating, for each of one or more received value estimator parameter, the corresponding eligibility trace(s) such that the eligibility trace(s) is proportional to the discounted sum of past partial derivative(s) of the value estimate, and wherein the gradient estimate is calculated without storing simultaneously in memory every observation of relevance to the gradient estimate, i.e. the gradient is estimated online.

15. The method of claim 9, further comprising the step of updating one or more value estimator parameters based on the gradient estimate.

16. The method of claim 9, further comprising the steps of:

obtaining the parameters of a technical actor system; and an actor observation;

generating an action from the actor parameters and the observation; and optimizing the actor parameters of the technical actor system.

17. The method of claim 16, further comprising the step of:
 controlling the technical actor system at least partly based on the generated action.

18. The method of claim 16, further comprising:
 at least partly assembling and/or configuring a fully or partially automated robot and/or vehicle, and
 configuring one or more processors of the robot and/or vehicle according to the actor parameter(s); or
 including in the robot and/or vehicle one or more processor(s) designed and/or configured according to the actor parameter(s).

19. The method of claim 16, further comprising performing an at least partially automated industrial process, wherein the industrial process is conducted based on control signal(s) from the technical planning system.

20. A computer-program product comprising a non-transitory computer-readable medium having stored thereon a computer program comprising instructions, which when executed by at least one processor, cause the at least one processor to perform the method according to claim 9.

\* \* \* \* \*